(12) United States Patent
Marriott

(10) Patent No.: US 7,445,238 B2
(45) Date of Patent: Nov. 4, 2008

(54) OCCUPANT PROTECTION APPARATUS

(75) Inventor: Brandon Scott Marriott, Farmington Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 236 days.

(21) Appl. No.: 11/162,059

(22) Filed: Aug. 26, 2005

(65) Prior Publication Data
US 2006/0249932 A1    Nov. 9, 2006

Related U.S. Application Data

(60) Provisional application No. 60/594,793, filed on May 6, 2005.

(51) Int. Cl.
*B60R 21/26* (2006.01)
*B60R 21/203* (2006.01)

(52) U.S. Cl. .................. 280/740; 280/729; 280/731

(58) Field of Classification Search ................ 280/729, 280/728.2, 728.1, 727, 740, 736, 731, 742
See application file for complete search history.

(56) References Cited

U.S. PATENT DOCUMENTS

| | | | |
|---|---|---|---|
| 3,632,135 A | 1/1972 | Chute | 280/731 |
| 3,727,942 A | 4/1973 | Arntson et al. | 280/731 |
| 3,819,203 A | 6/1974 | Radke et al. | 280/731 |
| 3,819,205 A | 6/1974 | Dunford et al. | 280/731 |
| 3,836,169 A | 9/1974 | Schiesterl | 280/731 |
| 3,895,823 A | 7/1975 | Stephenson | 280/731 |
| 3,984,126 A | 10/1976 | Goetz et al. | 280/740 |
| 4,006,918 A * | 2/1977 | MacFarland | 280/729 |
| 4,013,305 A | 3/1977 | Ichihara | 280/742 |
| 5,018,762 A | 5/1991 | Suzuki et al. | 280/731 |
| 5,078,423 A | 1/1992 | Fujita et al. | 280/743 |
| 5,160,164 A | 11/1992 | Fischer et al. | 280/743 |
| 5,172,933 A | 12/1992 | Strasser | 280/740 |
| 5,172,934 A | 12/1992 | Frantz et al. | 280/740 |
| 5,186,489 A | 2/1993 | Imai | 280/728 |
| 5,211,422 A * | 5/1993 | Frantz et al. | 280/740 |
| 5,249,824 A | 10/1993 | Swann et al. | 280/729 |
| 5,435,594 A | 7/1995 | Gille | 280/728.2 |
| 5,464,250 A | 11/1995 | Sato | 280/743.1 |
| 5,492,362 A | 2/1996 | Lehman et al. | 280/739 |
| 5,494,314 A | 2/1996 | Kriska et al. | 280/740 |
| 5,516,146 A * | 5/1996 | Kopitzke | 280/728.2 |
| 5,560,649 A | 10/1996 | Saderholm et al. | 280/743.1 |
| 5,573,270 A | 11/1996 | Sogi et al. | 280/740 |

(Continued)

*Primary Examiner*—Kevin Hurley
*Assistant Examiner*—Karen Amores
(74) *Attorney, Agent, or Firm*—Foley & Lardner LLP

(57) ABSTRACT

First and second lateral flaps depending from the central portion of a panel of air bag material are folded inwards towards the central portion so as to form a duct of a deflector which is closed along a top portion thereof. The duct is located inside an air bag between an inflator mounted from the outside of the air bag, and a retaining structure located within the duct, wherein the outlet end of the inflator extends through the openings in the air bag, the duct, and the retaining structure so as to provide for discharging inflation gas into the duct, which directs the gas downwardly into the airbag through an outlet proximate to a bottom edge of the panel. Holes in the lateral flaps are aligned so as to receive inflator mounting fasteners of the retaining structure, and so as to form the duct.

45 Claims, 13 Drawing Sheets

U.S. PATENT DOCUMENTS

| | | | | |
|---|---|---|---|---|
| 5,636,861 | A | 6/1997 | Orsulak et al. | 280/730.1 |
| 5,848,805 | A | 12/1998 | Sogi et al. | 280/743.2 |
| 5,913,535 | A | 6/1999 | Taguchi et al. | 280/729 |
| 5,957,485 | A | 9/1999 | Hirai | 280/729 |
| 5,957,486 | A | 9/1999 | Taguchi et al. | 280/729 |
| 6,017,054 | A * | 1/2000 | Magoteaux | 280/728.2 |
| 6,022,046 | A * | 2/2000 | Isomura et al. | 280/743.2 |
| 6,086,092 | A | 7/2000 | Hill | 280/729 |
| 6,089,599 | A | 7/2000 | Schimmoller et al. | 280/740 |
| 6,170,857 | B1 | 1/2001 | Okada et al. | 280/728.1 |
| 6,209,911 | B1 * | 4/2001 | Igawa et al. | 280/740 |
| 6,213,496 | B1 | 4/2001 | Minami et al. | 280/729 |
| 6,224,101 | B1 | 5/2001 | Nishijima et al. | 280/743.2 |
| 6,241,283 | B1 | 6/2001 | Zarazua | 280/743.2 |
| 6,247,727 | B1 | 6/2001 | Hamada et al. | 280/743.2 |
| 6,260,881 | B1 * | 7/2001 | Ellerbrok et al. | 280/740 |
| 6,302,433 | B1 | 10/2001 | Ellerbrok et al. | 280/729 |
| 6,345,841 | B2 | 2/2002 | Igawa et al. | 280/740 |
| 6,352,284 | B1 | 3/2002 | Okada et al. | 280/743.1 |
| 6,361,067 | B1 * | 3/2002 | Varcus et al. | 280/729 |
| 6,371,509 | B1 | 4/2002 | Ellerbrok et al. | 280/729 |
| 6,371,510 | B1 | 4/2002 | Marriott et al. | 280/730.1 |
| 6,382,662 | B1 * | 5/2002 | Igawa | 280/729 |
| 6,382,664 | B1 | 5/2002 | Hirano et al. | 280/730.2 |
| 6,471,239 | B1 | 10/2002 | Nishijima et al. | 280/729 |
| 6,471,244 | B1 | 10/2002 | Nishijima et al. | 280/742 |
| 6,478,331 | B1 | 11/2002 | Lang | 280/740 |
| 6,557,891 | B2 | 5/2003 | Okada et al. | 280/743.1 |
| 6,568,708 | B2 | 5/2003 | Miodek et al. | 280/740 |
| 6,585,290 | B2 | 7/2003 | Pinsenschaum et al. | 280/740 |
| 6,598,903 | B2 | 7/2003 | Okada et al. | 280/743.2 |
| 6,612,609 | B1 * | 9/2003 | Rodriguez et al. | 280/729 |
| 6,626,459 | B2 | 9/2003 | Takimoto et al. | 280/731 |
| 6,676,158 | B2 | 1/2004 | Ishikawa | 280/743.1 |
| 6,846,005 | B2 * | 1/2005 | Ford et al. | 280/728.2 |
| 6,926,303 | B2 * | 8/2005 | Fischer et al. | 280/729 |
| 6,962,364 | B2 * | 11/2005 | Ju et al. | 280/730.2 |
| 7,147,248 | B2 * | 12/2006 | Lee | 280/740 |
| 7,195,279 | B2 * | 3/2007 | Rose et al. | 280/740 |
| 7,210,702 | B2 * | 5/2007 | Soderquist | 280/740 |
| 7,281,734 | B2 * | 10/2007 | Abe et al. | 280/729 |
| 2001/0000015 | A1 * | 3/2001 | Igawa et al. | 280/740 |
| 2001/0015545 | A1 * | 8/2001 | Igawa et al. | 280/728.2 |
| 2002/0027350 | A1 | 3/2002 | Pinsenschaum et al. | 280/740 |
| 2002/0033590 | A1 * | 3/2002 | Adkisson | 280/728.3 |
| 2002/0038949 | A1 * | 4/2002 | Okada et al. | 280/743.2 |
| 2002/0130493 | A1 | 9/2002 | Ford et al. | 280/728.2 |
| 2003/0173760 | A1 * | 9/2003 | Dillon et al. | 280/729 |
| 2005/0073139 | A1 * | 4/2005 | Fischer et al. | 280/740 |
| 2006/0249932 | A1 * | 11/2006 | Marriott | 280/729 |
| 2007/0108740 | A1 * | 5/2007 | Salmon et al. | 280/728.2 |

\* cited by examiner

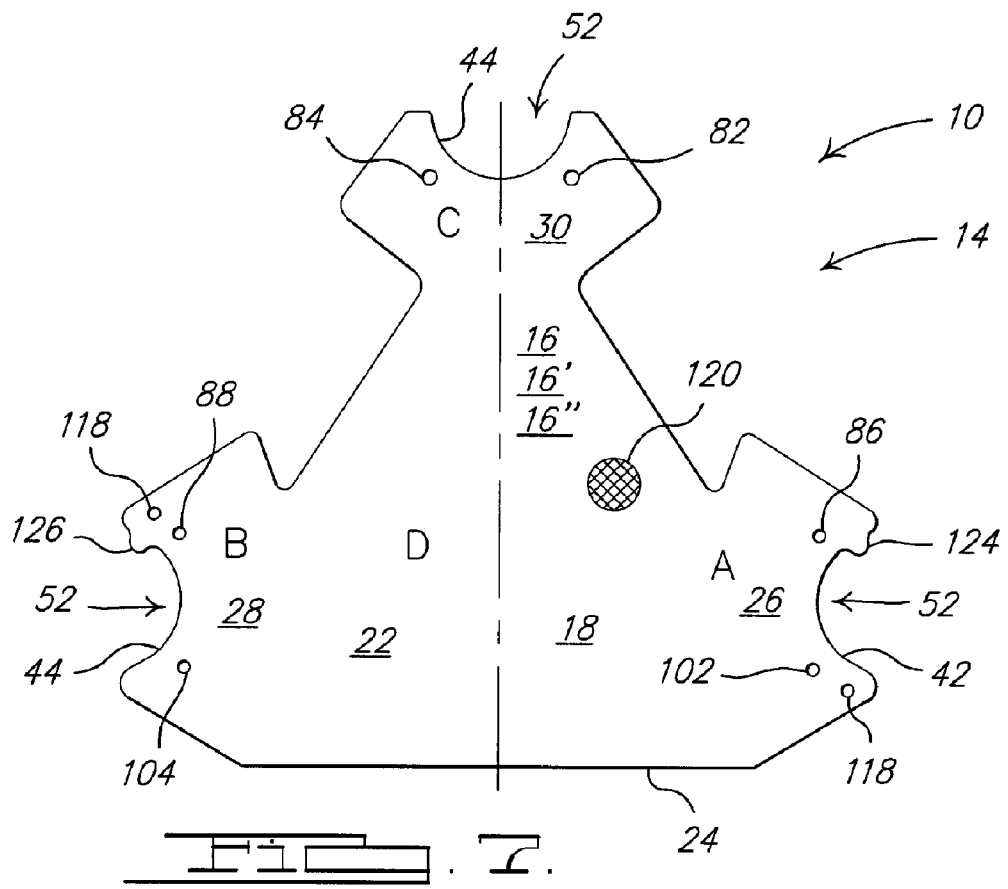
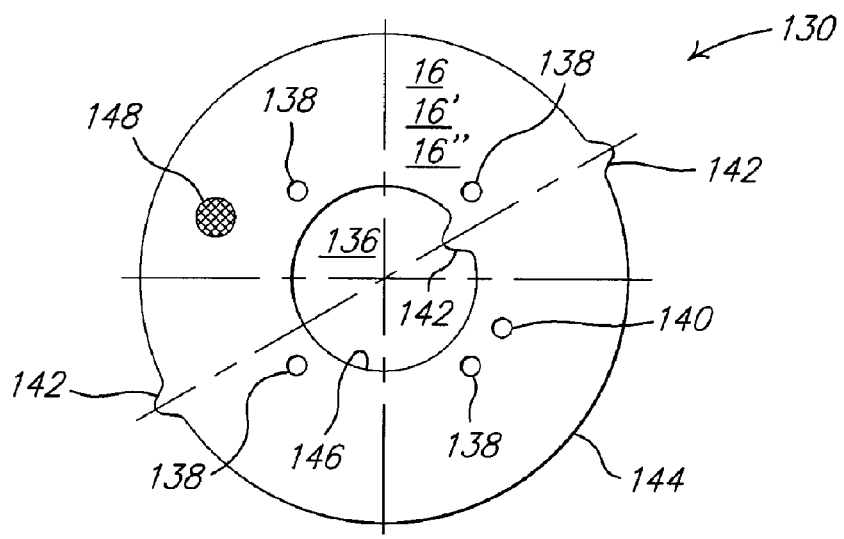

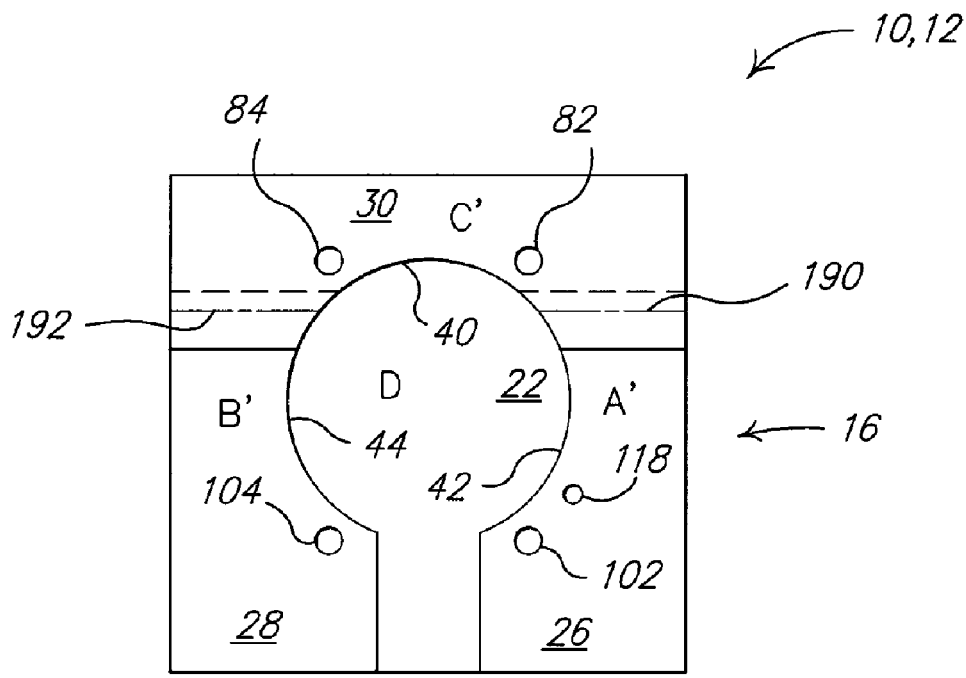
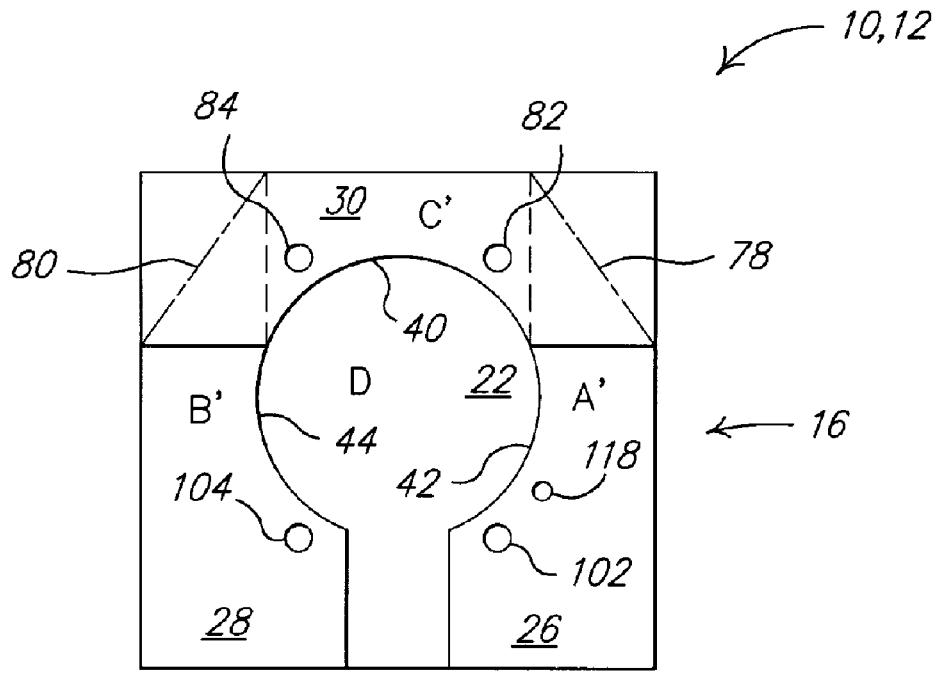
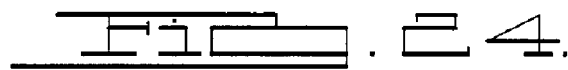

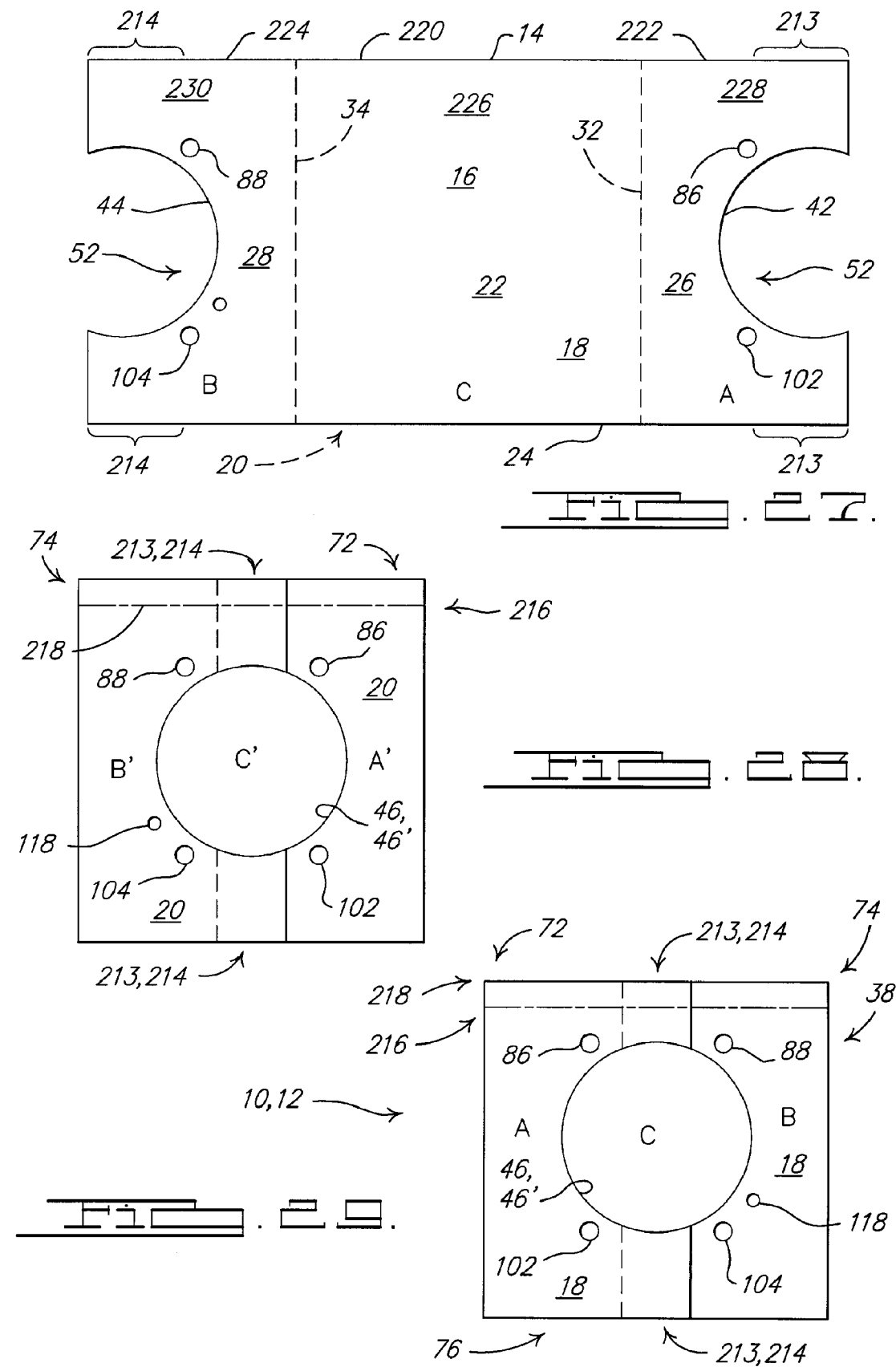

US 7,445,238 B2

OCCUPANT PROTECTION APPARATUS

CROSS-REFERENCE TO RELATED APPLICATIONS

The instant application claims the benefit of prior U.S. Provisional Application Ser. No. 60/594,793 filed on May 6, 2005, which is incorporated herein by reference.

BRIEF DESCRIPTION OF THE DRAWINGS

In the accompanying drawings:

FIG. 7 illustrates a second embodiment of a deflector panel;

FIG. 8 illustrates a heat shield;

FIG. 23 illustrates a fifth embodiment of a deflector;

FIG. 24 illustrates a sixth embodiment of a deflector;

FIG. 27 illustrates a first surface of an eighth embodiment of a deflector panel;

FIG. 28 illustrates an eighth embodiment of a deflector folded from the eighth embodiment of the deflector panel illustrated in FIG. 27; and FIG. 29 illustrates the eighth embodiment of the deflector folded inside out relative to the deflector illustrated in FIG. 28.

DESCRIPTION OF EMBODIMENT(S)

Figure 1:
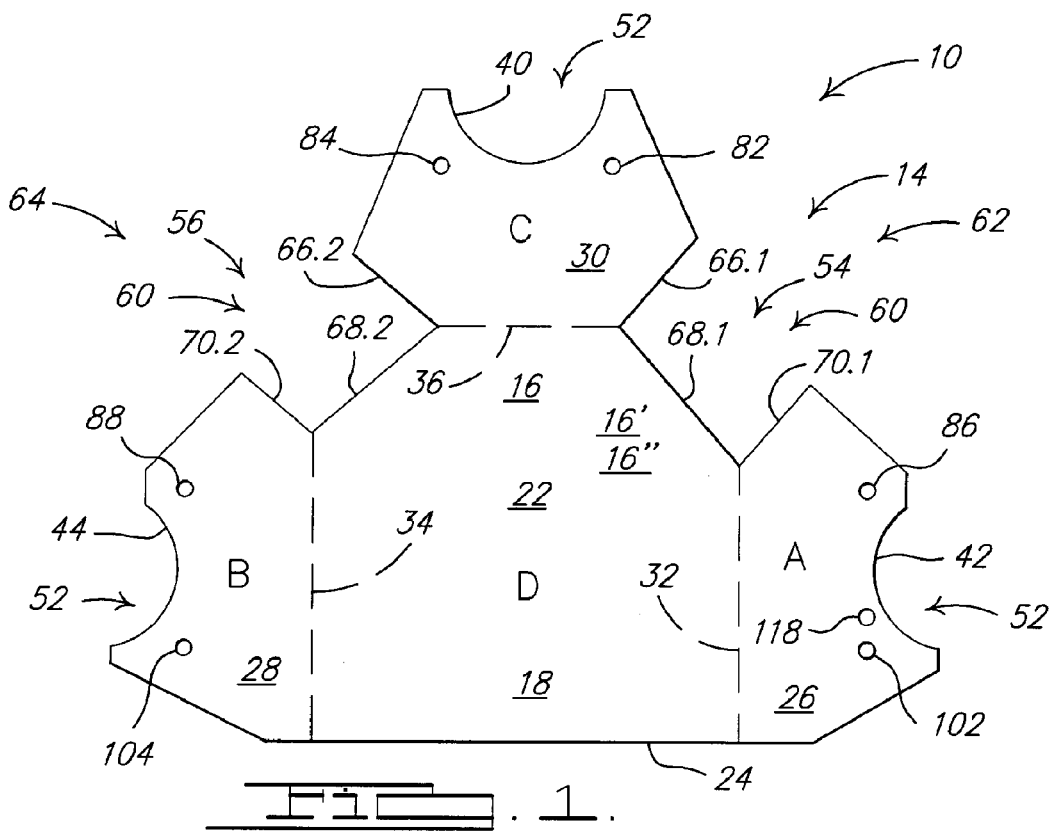
FIG. 1 illustrates a first surface of a first embodiment of a deflector panel.

Referring to FIGS. 1-6b, a first embodiment of an occupant protection apparatus 10 comprises a deflector 12 comprising a panel 14 constructed of air bag material 16, for example, a fabric 16', e.g. a 420 denier nylon fabric, which, for example, may be coated with a coating material, for example, a silicone coating material 16", so as to provide for improved heat resistance, to seal against leakage, and to provide for improved packaging. For example, the panel 14 of air bag material 16 may comprise a fabric 16' coated with the silicone coating material 16" on a first surface 18 thereof, and the opposing second surface 20 thereof may be either coated, partially coated, or uncoated. Other coatings may be used, for example, neoprene. Alternatively, the air bag material 16 may be an uncoated fabric, or a non-woven material. The panel 14 comprises a central portion 22 having a bottom edge 24, first 26 and second 28 lateral flaps, and a top flap 30, wherein the first 26 and second 28 lateral flaps and the top flap 30 are on opposing sides and above the central portion 22 respectively, so as to abut the sides and top thereof at respective first 32, second 34 and third 36 fold lines respectively. In FIGS. 1-6a, the first surfaces 18 of the first 26 and second 28 lateral flaps, the top flap 30 and the central portion 22 are labeled A, B, C, and D respectively, and the corresponding second surfaces 20 thereof are labeled A', B', C', and D' respectively.

Figure 2:
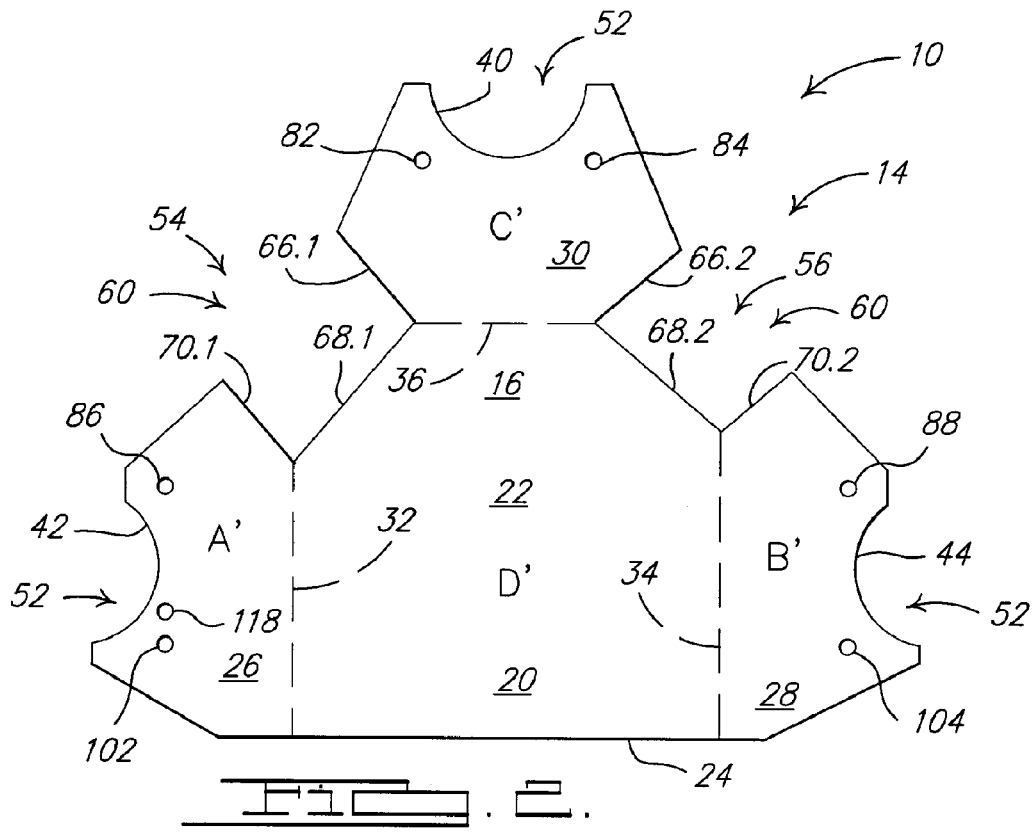
FIG. 2 illustrates a second surface of the first embodiment of the deflector panel.
Figure 3:
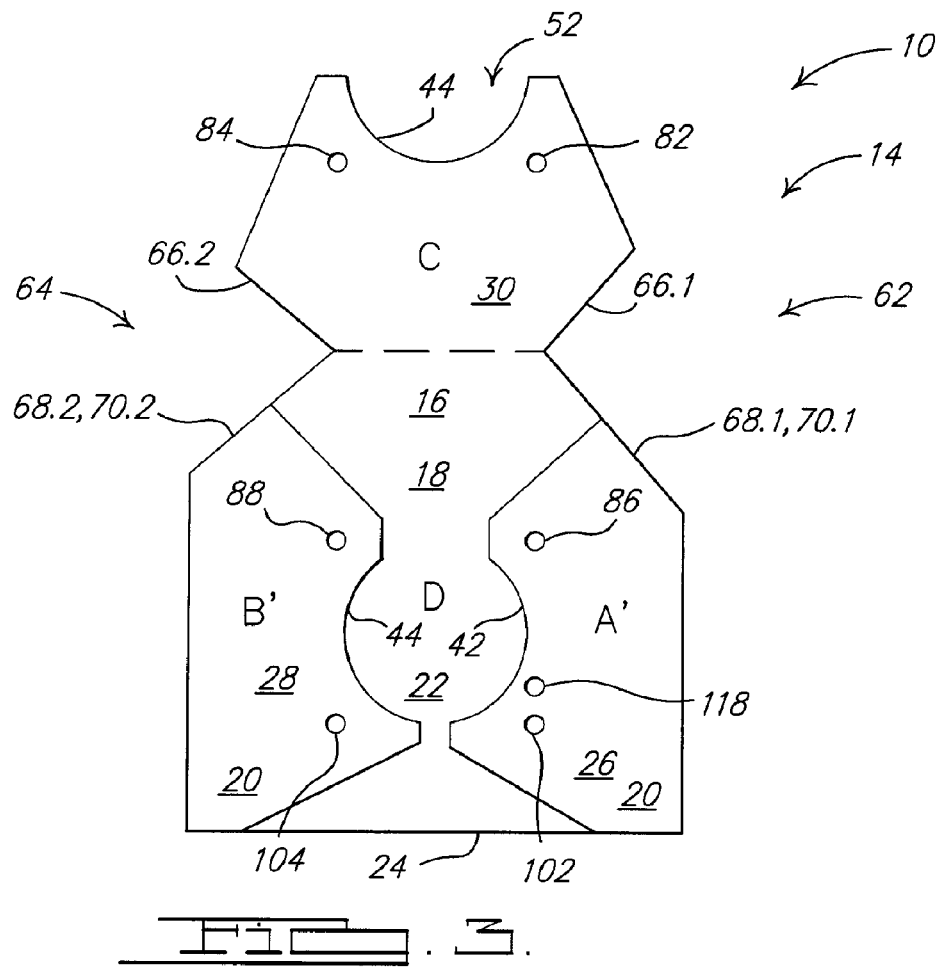
FIG. 3 illustrates first and second folding operations for forming a first embodiment of the deflector from the deflector panel illustrated in FIGS. 1 and 2.
Figure 4:
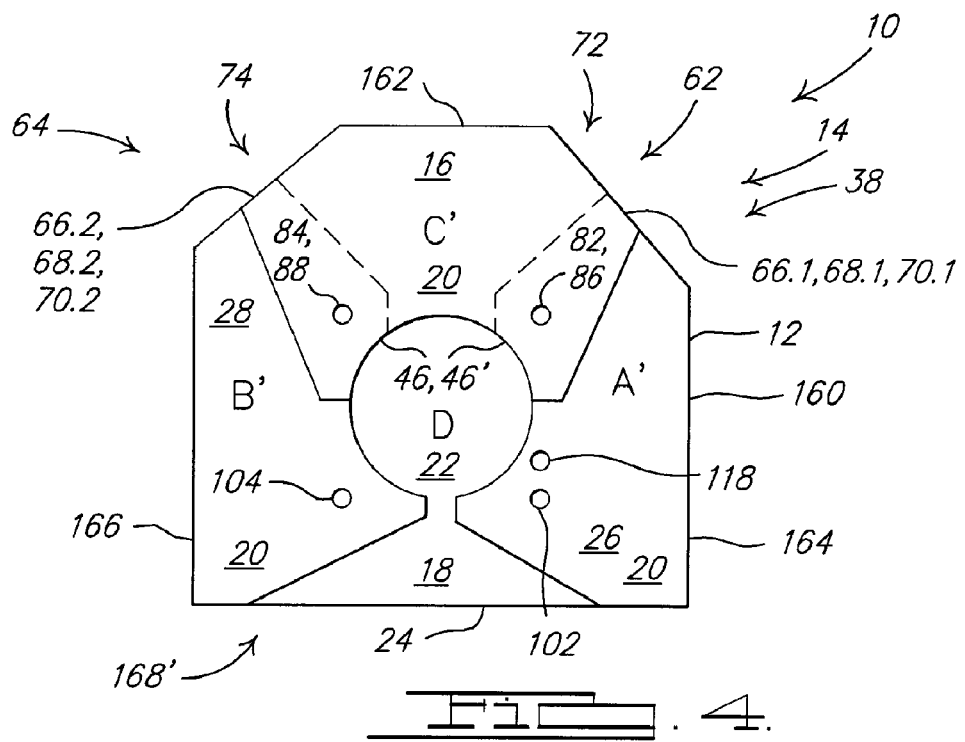
FIG. 4 illustrates a final folding operation for forming the first embodiment of the deflector from the deflector panel illustrated in FIGS. 1 and 2, wherein the deflector exhibits open corner regions.
Figure 11:
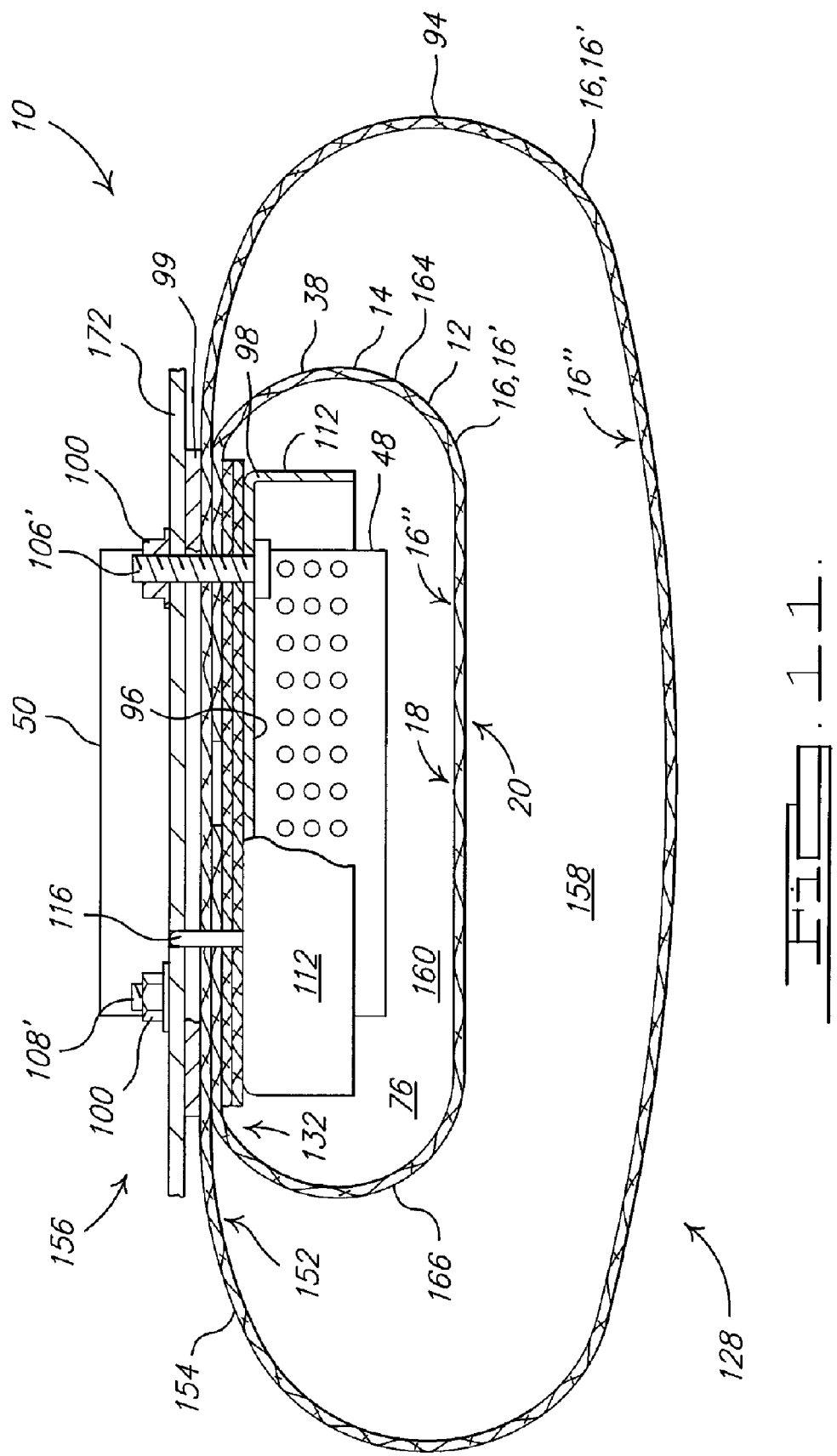
FIG. 11 illustrates the second embodiment of the deflector assembled in an air bag with an air bag inflator.

Referring to FIGS. 3 and 4, the deflector 12 is formed from the panel 14 by folding each of the first 26 and second 28 lateral flaps inward about the respective first 32 and second 34 fold lines, and folding the top flap 30 downwards about the third fold line 36, towards each other and towards the central portion 22, so as to form a resulting folded panel 38 of the deflector 12. The top edge 40 of the top flap 30, and the respective outboard edges 42, 44 of the first 26 and second 28 lateral flaps are shaped so as to cooperate with one another in the folded panel 38 so as to form an associated first opening 46 that is adapted to receive an outlet end 48 of an air bag inflator 50, for example, as is illustrated in FIG. 11. For example, in the embodiments illustrated in FIGS. 1-7, the top edge 40 of the top flap 30, and the respective outboard edges 42, 44 of the first 26 and second 28 lateral flaps are arcuately shaped 52 so a to provide for a substantially circular first opening 46' in the folded panel 38 of the deflector 12.

Referring to FIGS. 1 and 2, in a first embodiment, the panel 14 is shaped so as to provide first 54 and second 56 cut-out regions, for example, each with a substantially rectangular shape 60, located between the top flap 30 and the first lateral flap 26, and between the top flap 30 and the second lateral flap 28 respectively. For example, in the first embodiment, the first 54 and second 56 cut-out regions are located at approximately the one-two 62 and ten-eleven 64 o'clock positions relative to the bottom edge 24 of the central portion 22.

The first 54 and second 56 cut-out regions are bounded by respective first edges 66.1, 66.2 of the top flap 30, respective second edges 68.1, 68.2 of the central portion 22, and respective third edges 70.1, 70.2 of the first 26 and second 28 lateral flaps respectively. The first 54 and second 56 cut-out regions are adapted so that when the first 26 and second 28 lateral flaps and top flap 30 are folded about the first 32, second 34 and third 36 fold lines so as to form the folded panel 38, the first edges 66.1, 66.2 and respective third edges 70.1, 70.2 become substantially aligned with the respective second edges 68.1, 68.2 and with one another so as to define respective first 72 and second 74 corner regions of the folded panel 38.

Figure 5:
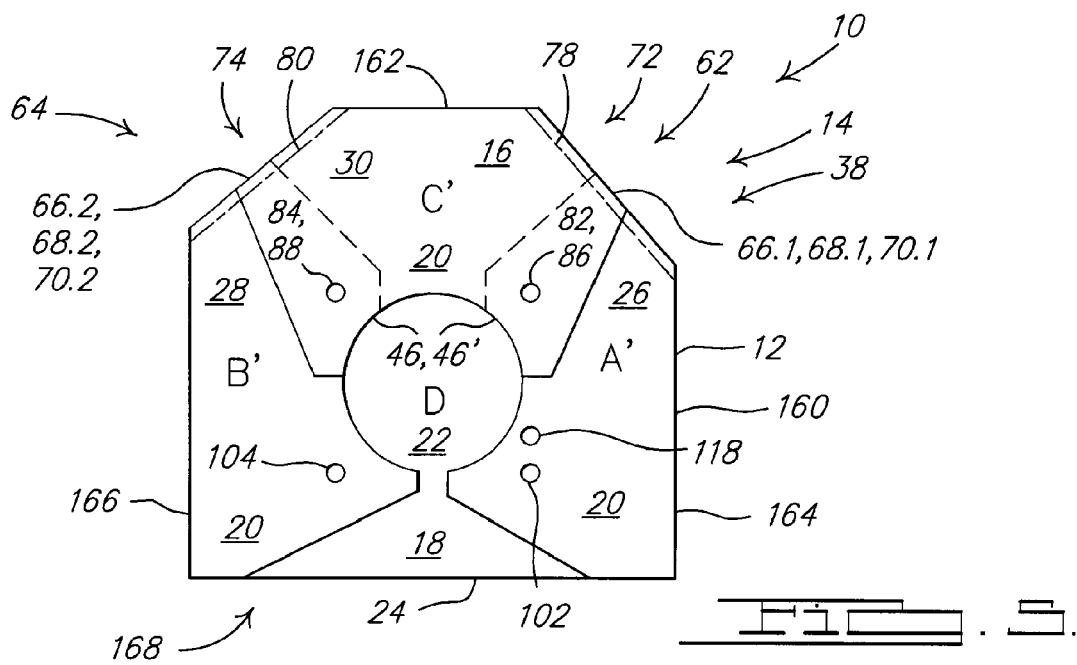
FIG. 5 illustrates the first embodiment of a deflector with sewn corner regions.
Figure 6A:
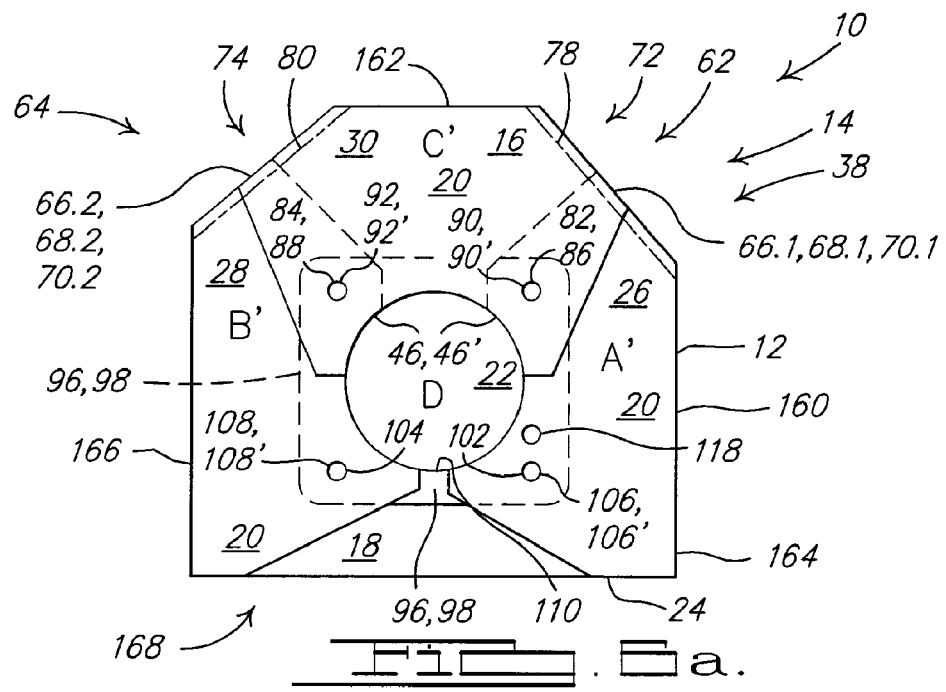
FIGS. 6a and 6b illustrate the first embodiment of the deflector of FIG. 5 after installation of a retaining structure.

The folded panel 38 defines a cavity 76 that is bounded by the central portion 22, the folded top flap 30, and the folded first 26 and second 28 lateral flaps, and which is open proximate to the bottom edge 24 of the central portion 22 so as to provide for a flow of inflation gas therefrom, wherein the first surface 18 of the air bag material 16 of the panel 14 faces towards the cavity 76. Referring to FIG. 4, in accordance with one aspect, the first 72 and second 74 corner regions are not substantially sealed or sewn, so that the cavity 76 is open thereacross so as to provide for flow of inflation gas therefrom. Referring to FIGS. 5 and 6*a*, in accordance with another aspect, the first 72 and second 74 corner regions are substantially sealed or sewn, for example, with associated first 78 and second 80 sewn seams, so that the cavity is substantially closed thereat so as to substantially prevent a flow of inflation gas therefrom. For example, portions of the panel 14 proximate to the first 66.1, second 68.1 and third 70.1 edges bounding the first cut-out region 54 are sewn together by the first sewn seam 78, and portions of the panel 14 proximate to the first 66.2, second 68.2 and third 70.2 edges bounding the second cut-out region 56 are sewn together by the second sewn seam 80. In accordance with another aspect not illustrated in the drawings, one of the first 72 and second 74 corner regions could be substantially sealed or sewn so as to prevent a flow of inflation gas therefrom, and the other of the first 72 and second 74 corner regions could be open so as to provide for an opening thereat from the cavity 76, thereby providing for a flow of inflation gas therefrom.

The top flap 30 incorporates first 82 and second 84 holes and the first 26 and second 28 lateral flaps incorporate third 86 and fourth 88 holes respectively, which collectively are adapted so that when the panel 14 is folded, the first lateral flap 26 and the top flap 30 overlap one another and the first 82 and third 86 holes become aligned so as to provide for engaging a first fastener 90 therewith, and the second lateral flap 26 and the top flap 30 overlap one another and the second 84 and fourth 88 holes become aligned so as to provide for engaging a second fastener 92 therewith, wherein the first 90 and second 92 fasteners are used to assemble the air bag inflator 50 and the deflector 12 with an air bag 94, for example, as illustrated in FIG. 11.

Figure 6B:
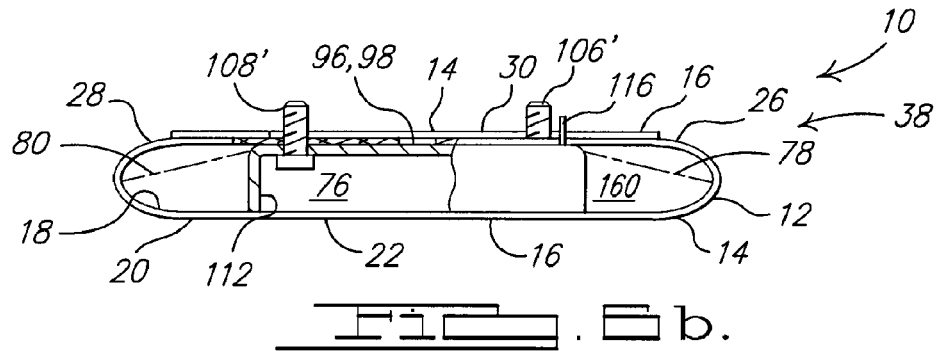
Figure 9A:
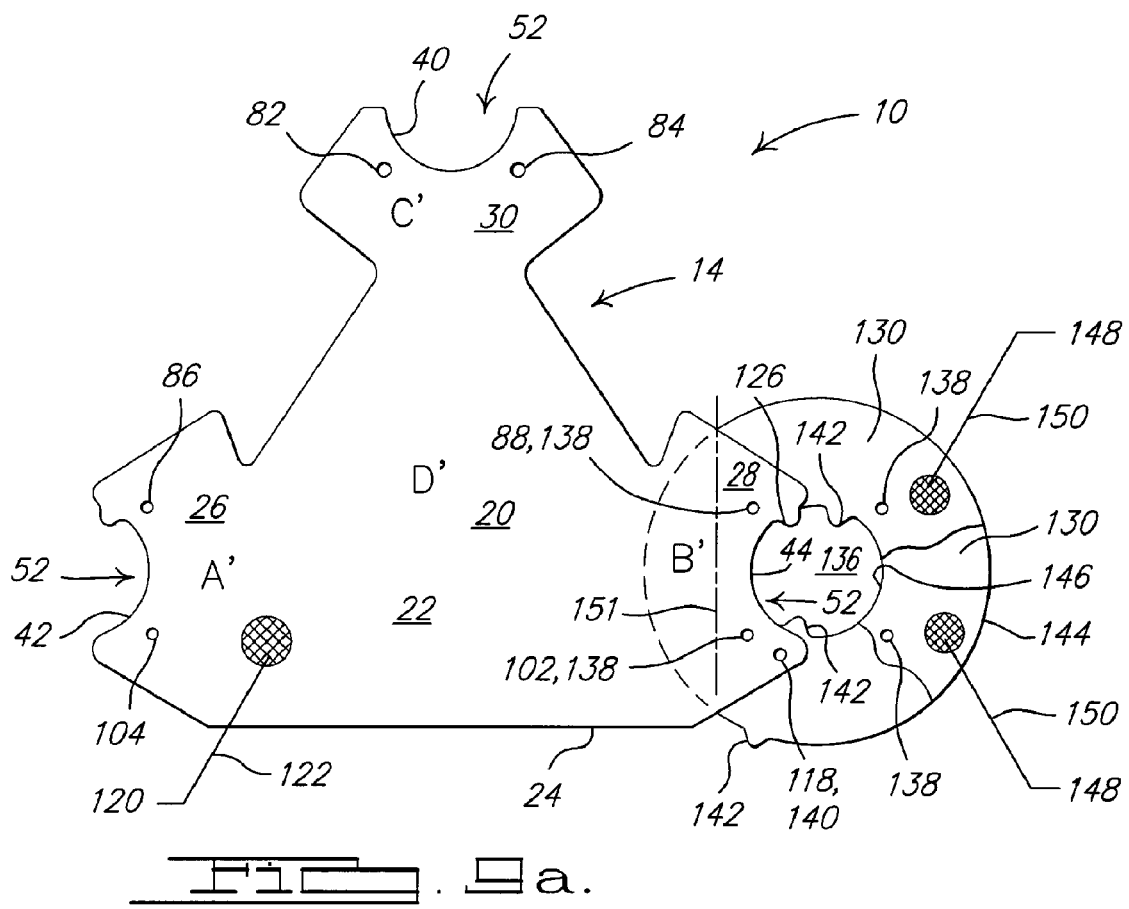
FIGS. 9a and 9b illustrate a first assembly operation for assembling the second embodiment of the deflector panel illustrated in FIG. 7 to a plurality of heat shields illustrated in FIG. 8.
Figure 9B:
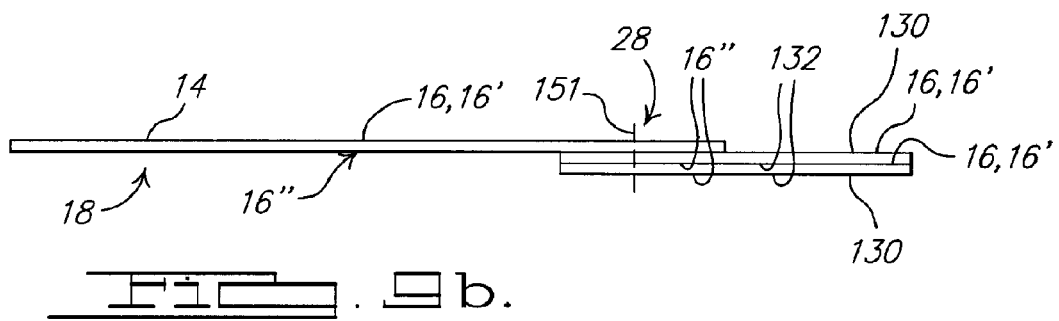
Figure 10:
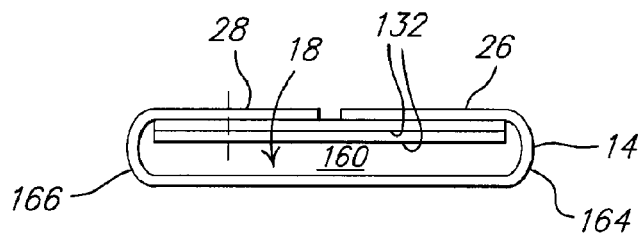
FIG. 10 illustrates an end view of the second embodiment of the deflector.

For example, referring to FIGS. 6*a*, 6*b* and 11, in accordance with one aspect, the first 90 and second 92 fasteners comprise corresponding first 90' and second 92' threaded studs which depend from a plate portion 96 of a retaining structure 98 located on the inside of the cavity 76 of the folded panel 38 so as to provide for securing the air bag inflator 50 to the air bag 94 and to the folded panel 38 located therewithin by providing for clamping portions of the first 26 and second 28 lateral flaps, the top flap 30 and the air bag 94 between a flange 99 of the air bag inflator 50 and the plate portion 96 of the retaining structure 98 with associated nuts 100 on the first 90' and second 92' threaded studs. The first 26 and second 28 lateral flaps further comprise respective fifth 102 and sixth 104 holes in respective lower portions thereof that are adapted to engage respective third 106 and fourth 108 fasteners that are also used to assemble the air bag inflator 50 and the deflector 12 with the air bag 94. For example, the third 106 and fourth 108 fasteners comprise third 106' and fourth 108' threaded studs that cooperate with associated nuts 100 so as to provide for clamping portions of the first 26 and second 28 lateral flaps, the top flap 30 and the air bag 94 between the air bag inflator 50 and the plate portion 96 of the retaining structure 98. The plate portion 96 of the retaining structure 98 further comprises a second opening 110 that is shaped, e.g. substantially circular, so as to provide for receiving an outlet end 48, of the air bag inflator 50 therethrough, wherein the second opening 110 of the plate portion 96 of the retaining structure 98 cooperates with the first opening 46 in the folded panel 38. It should be understood that the first 90, second 92, third 106 and fourth 108 fasteners, or any other fasteners, are not limited to any particular type, and, for example, could be selected from any combination of threaded screws or bolts with associated nuts, threaded studs with associated nuts, studs with push-on nuts, rivets, pins, snap-tabs, or some other fastening system.

The retaining structure 98 further comprises a deflection ring 112 extending from the plate portion 96 towards the inside of the cavity 76 and adapted to deflect inflation gas 114 generated by the air bag inflator 50 away from the retaining structure 98, so as to prevent a substantial portion of the inflation gas 114 generated by the air bag inflator 50 from directly impinging upon the interior of the deflector 12. For example, the plate portion 96 and the deflection ring 112 of the retaining structure 98 may be stamped from a single piece of material, e.g. steel. Alternatively, the deflection ring 112 could be incorporated as part of the air bag inflator 50.

The retaining structure 98 further comprises an alignment tab 116 extending from the plate portion 96 thereof, wherein the alignment tab 116 is adapted to cooperate with the air bag inflator 50 and the folded panel 38 so as to align the air bag inflator 50 relative to the folded panel 50. More particularly, either the first 26 or second 28 lateral flaps, and possibly the top flap 30, incorporate an alignment hole 118 that is adapted to receive the alignment tab 116 of the retaining structure 98, so as to prevent a misalignment of the retaining structure 98 relative to the folded panel 38, and so as to thereby prevent a misalignment of the air bag inflator 50 relative to both the retaining structure 98 and the folded panel 38.

Referring to FIG. 7, a second embodiment of a panel 14 is constructed of a fabric 16' air bag material 16 which is coated with silicone coating material 16" on the first surface 18 thereof, wherein the woven fibers 120 of the fabric 16' are illustrated as oriented in a direction 122 that is oblique with respect to the bottom edge 24 of the panel 14. Alternatively, the woven fibers 120 could be oriented in a direction 122 that is substantially aligned with the bottom edge 24 of the panel 14. Furthermore, the outboard edges 42, 44 of the first 26 and second 28 lateral flaps are provided with corresponding witness elements 124, 126, e.g. witness tabs, each of a different shape—e.g. a triangular shape and a semicircular shape, respectively—that provide for aligning the folded panel 38 during an associated assembly operation of an associated air bag assembly 128, or a portion thereof.

Referring to FIGS. 8-11, a plurality of heat shields 130, each constructed of an air bag material 16, for example, a fabric 16' with a silicone coating material 16" on a first surface 132 thereof, are adapted to be located on an inside 134 of the folded panel 38 between the plate portion 96 of the retaining structure and portions of the top flap 30 and the first 26 and second 28 lateral flaps of the folded panel 38 proximate to the first opening 46, thereby providing for reducing the heating of the top flap 30 and the first 26 and second 28 lateral flaps of the folded panel 38 so as to maintain the structural integrity of the deflector 12 during inflation. Other coatings may be used, for example, neoprene. Alternatively, the air bag material 16 may be an uncoated fabric, or a non-woven material. The heat shields 130 incorporate associated third openings 136 adapted to receive the outlet end 48 of an air bag inflator 50, associated fastener holes 138 adapted to receive the first 90', second 92', third 106' and fourth 108' threaded studs, and an alignment hole 140 adapted to receive the alignment tab 116 of the retaining structure 98. A plurality of witness elements 142, e.g. witness tabs, are located along the external perimeter 144 of each heat shield 130, and along the internal perimeter 146 of each associated third opening 136, so as to provide for aligning the heat shields 130 with the folded panel 38 during an associated assembly operation of an associated air bag assembly 128, or a portion thereof. For example, referring to FIG. 9a, in one embodiment, the witness elements 142 provide for aligning the woven fibers 148 of the heat shields 130 relative to the bottom edge 24 of the panel 14, for example, so that the direction 150 of the woven fibers 148 is oblique to both the bottom edge 24 of the panel 14 and to the woven fibers 120 of the panel 14. For example, in accordance with a first assembly operation, the heat shields 130 are sewn along a sewn seam 151 to the second lateral flap 28 after aligning the fastener holes 138 of the heat shields 130 with the associated fourth 88 and sixth 104 holes of the second lateral flap 28, wherein the first surfaces 18,132 of the panel 14 and heat shields 130—for example, each with the associated silicone coating material 16"—are each oriented so as to face inwards towards the cavity 76 of the folded panel 38.

Figure 12:
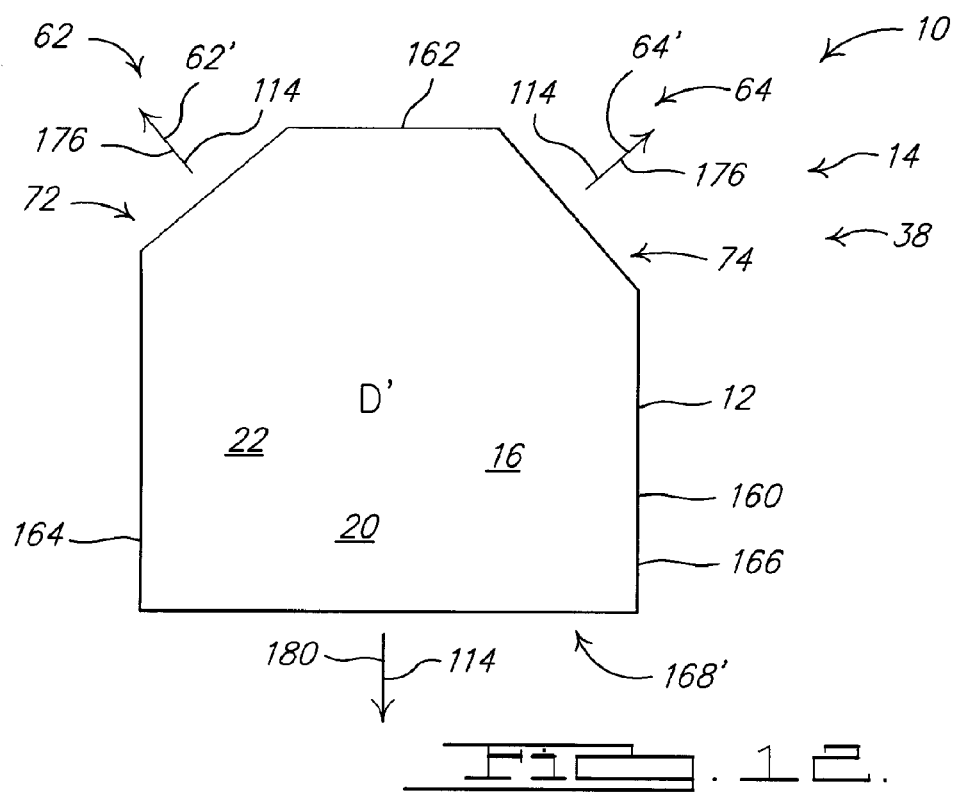
FIG. 12 illustrates the operation of a deflector with open corner regions.
Figure 13:
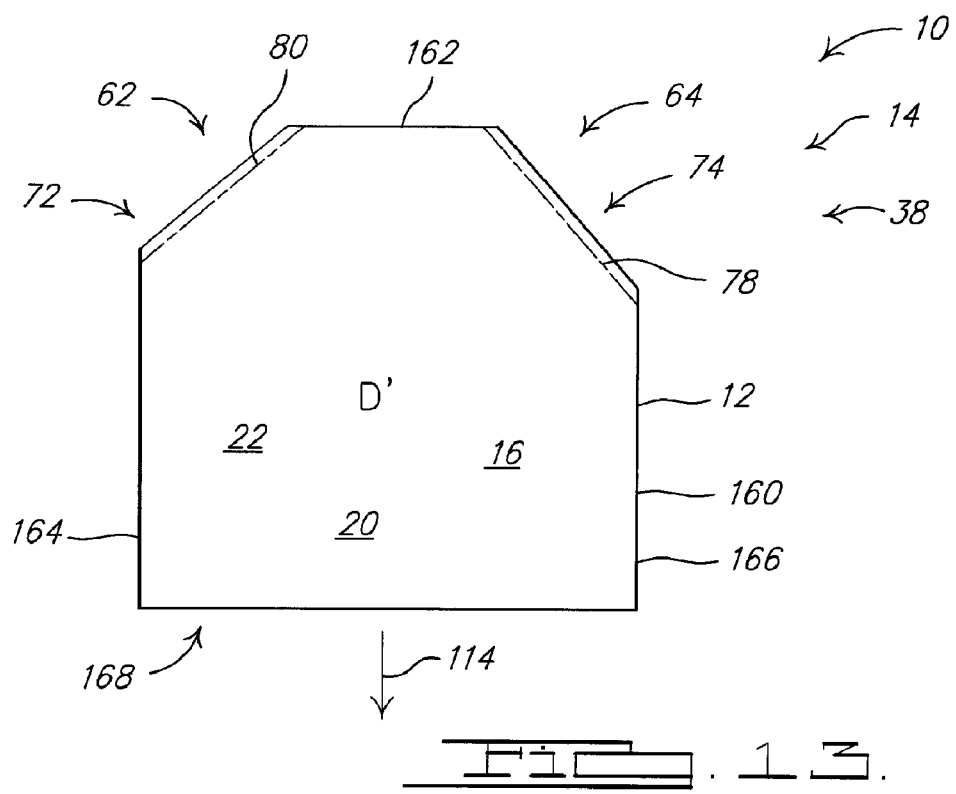
FIG. 13 illustrates the operation of a deflector with sewn corner regions.
Figure 14:
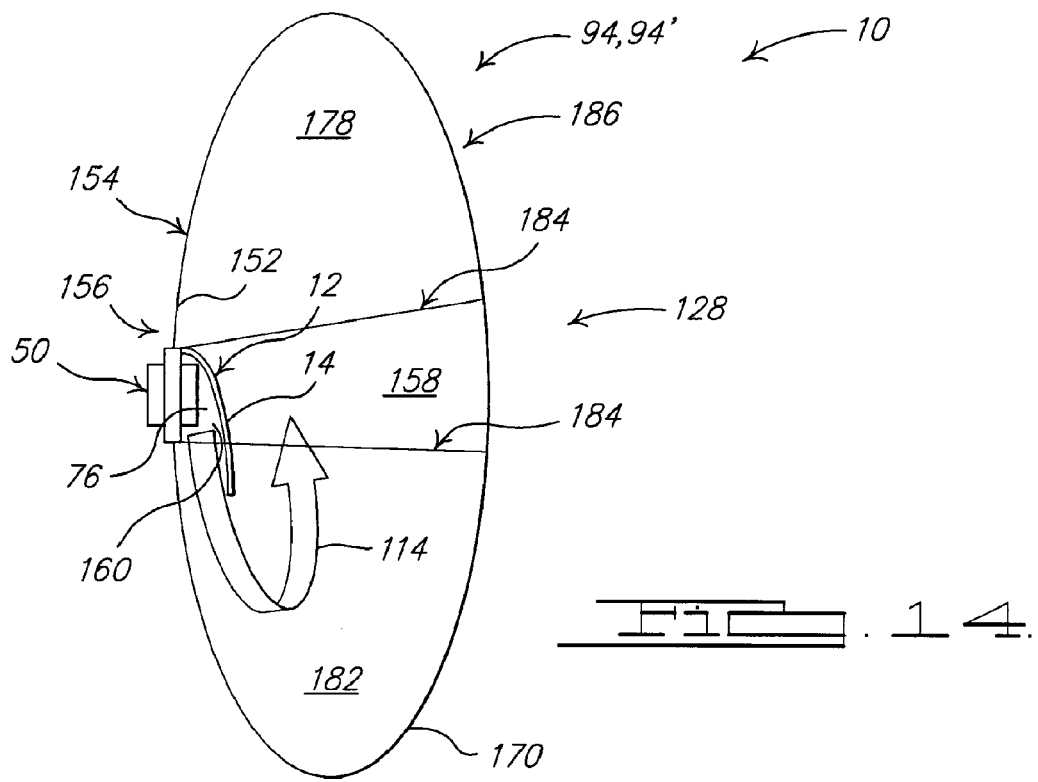
FIG. 14 is a cross-sectional view of air bag inflator module illustrating the operation of an associated deflector incorporated therein.

Referring to FIG. 11, the air bag assembly 128 is assembled by placing the folded panel 38 and heat shield 130 subassembly on an inside surface 152 of a first exterior panel portion 154 of an air bag 94, and then inserting an air bag inflator 50 through a fourth opening 156 in the first exterior panel portion 154, and then through the first opening 46 in the folded panel 38 and the third openings 136 in the associated heat shields 130, and finally through the second opening 110 in the plate portion 96 of the retaining structure 98. For example, the top edge 40 and the outboard edges 42, 44 of the first 26 and second 28 lateral flaps are adapted so as to provide for clearance between the first opening 46 and the outlet end 48 of the air bag inflator 50. Referring also to FIGS. 12-14, accordingly, the outlet end 48 of the air bag inflator 50 is located within the cavity 76 of folded panel 38, which is located within the interior 158 of the air bag 94, so that the inflation gas 114 generated by the air bag inflator 50 is first deflected into the cavity 76 by the deflection ring 112 of the retaining structure 98, and then directed through an associated duct 160 into the remainder of the interior 154 of the air bag 94 by the deflector 12, wherein the duct 156 comprises a top boundary 162 formed by the top flap 30, and first 164 and second 166 lateral boundaries formed by the first 26 and second 28 lateral flaps. In accordance with one aspect, the outlet 168 of the duct 160—located proximate to the bottom edge 24 of the associated folded panel 38—is oriented in the substantially downwards relative to the air bag 94 so as to provide for directing the inflation gas 114 downwards towards the bottom end 170 of the air bag 94.

Figure 15:
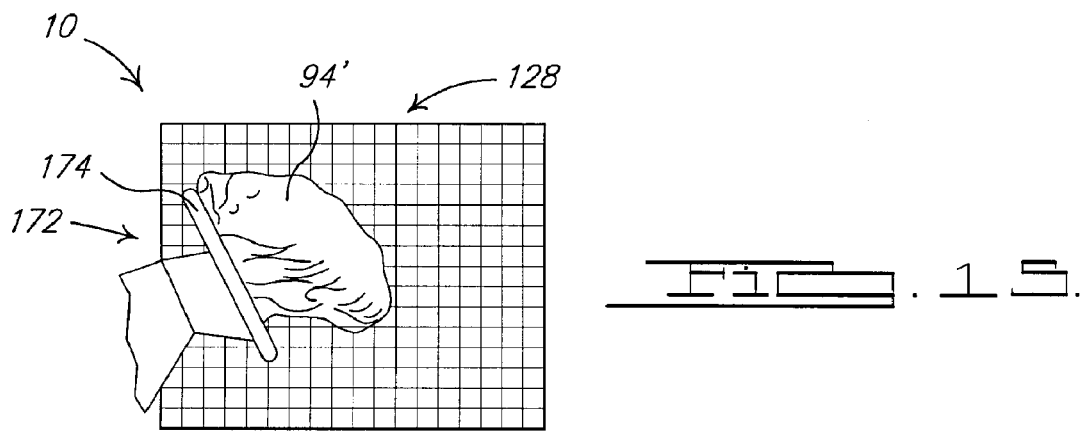
FIG. 15 is a side view of an air bag inflator module incorporating a deflector therein, illustrating the inflation of an associated air bag.

Referring to FIGS. 12-15, in accordance with one aspect, the deflector 12 is installed in a driver air bag 94' adapted to be installed in an air bag inflator module 172 that is mountable within a steering wheel 174 of a vehicle, wherein the air bag inflator module 172 incorporates an air bag module cover. Referring to FIG. 12, in accordance with the aspect of the deflector 12 with open first 72 and second 74 corner regions as illustrated in FIG. 4, upon inflation, a first portion 176 of the inflation gas 114 from the air bag inflator 50 is directed from the duct 160 through the first 72 and second 74 corner regions in approximately the one-two 62' and ten-eleven 64' o'clock directions so as to fill an upper portion 178 of the air bag 94, and a remaining second portion 180 of the inflation gas 114 from the duct 160 is directed downwards from primary outlet 168' of the duct 160 so as to fill a lower portion 182 of the air bag 94. Referring to FIGS. 13-15, in accordance with the aspect of the deflector 12 with closed first 72 and second 74 corner regions as illustrated in FIG. 5 and 6a, upon inflation, the inflation gas 114 is directed from the duct 160 downwards from outlet 168 of the duct 160 so as to fill the lower portion 182 of the air bag 94. Referring to FIG. 14, the air bag 94 may be adapted with one or more tethers 184 operative between a region proximate to the mounting location of air bag inflator 50, and a second exterior panel portion 186 of the air bag 94, so as to provide for controlling the deployment thereof.

Figure 16:
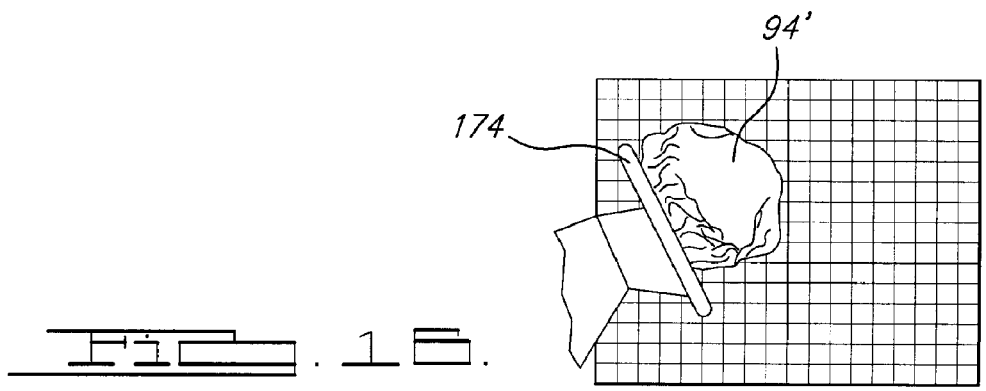
FIG. 16 is a side view of an air bag inflator module that does not incorporate a deflector therein, illustrating the inflation of an associated air bag, for comparison with FIG. 15.

Accordingly, the deflector 12 provides for preferentially filling the lower portion 182 of the air bag 94, which can be beneficial to occupants, e.g. out-of-position drivers or drivers of small stature, proximate to the associated air bag inflator module 172 by directing the inflation gas 114 away from the head and or neck of the occupant. The deflector 12 also provides for improved coverage of the six o'clock region of the steering wheel 174 when the inflating air bag 94, as a result of enhanced flow of inflation gas 114 to the associated portion of the air bag 94 early in a crash event. This is demonstrated by a comparison of FIGS. 15 and 16, wherein in FIG. 15, the driver air bag 94' inflated with the benefit of a deflector 12 exhibits substantially more downwardly directed inflation than a corresponding driver air bag inflated without the benefit of the deflector 12, as illustrated in FIG. 16. The deflector 12 may provide sufficient protection with a single-stage air bag inflator 50 in some applications that might otherwise require a multi-stage inflator for corresponding injury mitigation performance. Furthermore, the folded panel 38 structure of the deflector 12 does not require sewing into the structural first exterior panel portion 154.

Figure 17:
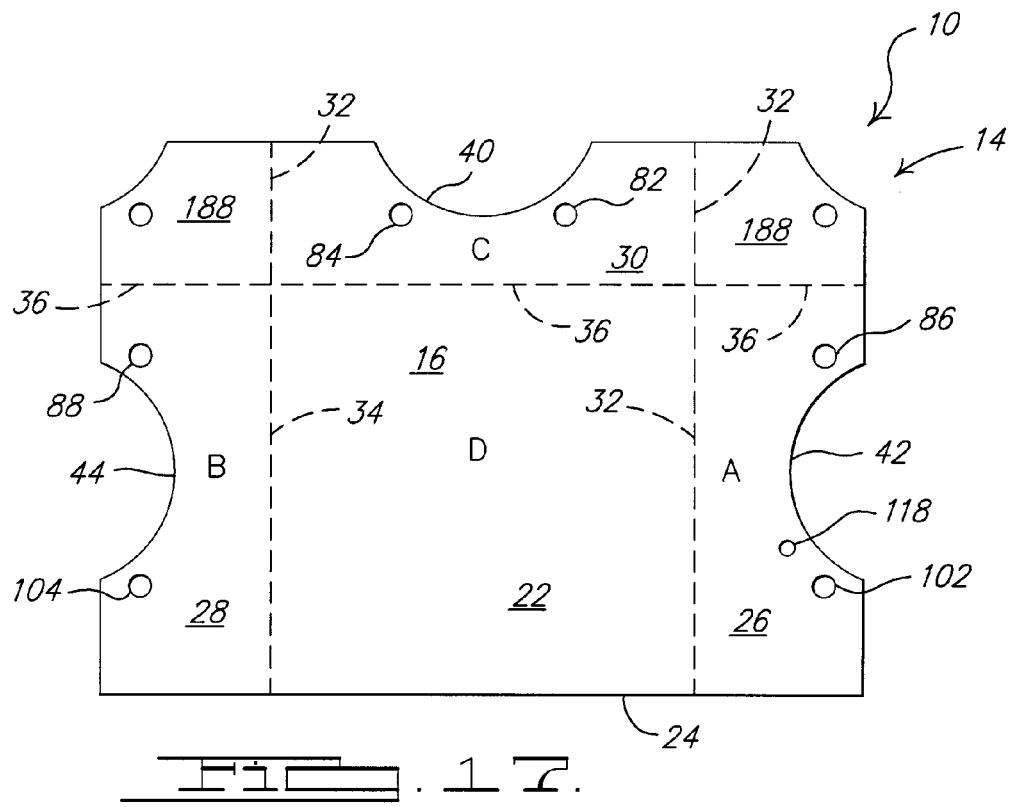
FIG. 17 illustrates a third embodiment of a deflector panel in an unfolded condition.
Figures 18, 19:
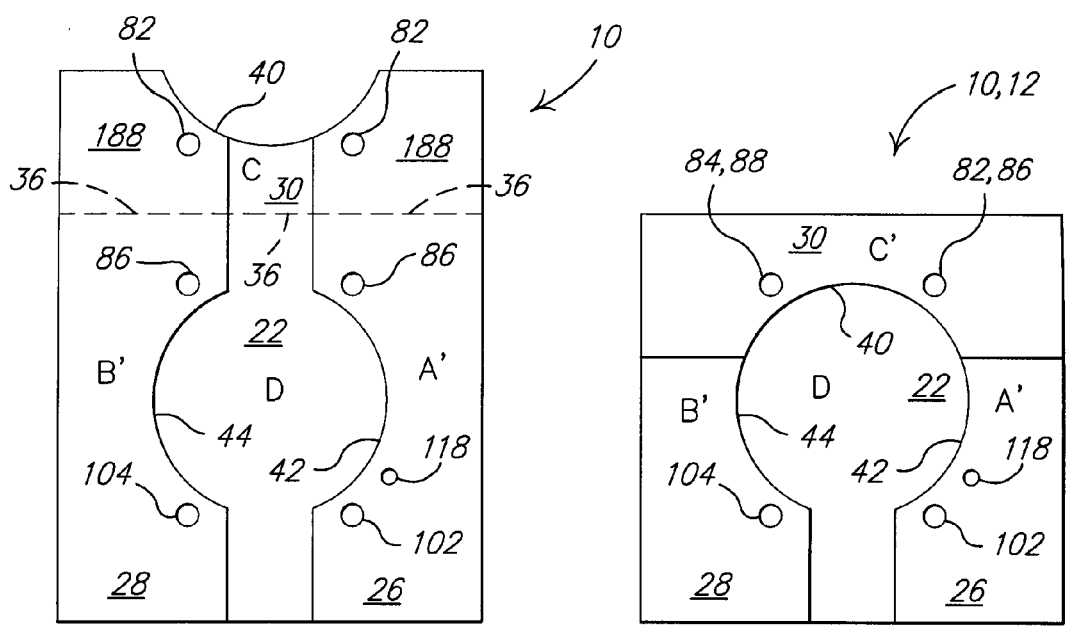
FIG. 18 illustrates first and second folding operations for forming a third embodiment of the deflector from the deflector panel illustrated in FIG. 17.
FIG. 19 illustrates a final folding operation for forming the third embodiment of the deflector from the deflector panel illustrated in FIG. 17.

Referring to FIGS. 17-19, in accordance with a third embodiment of a deflector 12, the top flap 30 and the first 26 and second 28 lateral flaps bound respective corner regions 188 delineated by the first 32, second 34 and third 36 fold lines. The first 26 and second 28 lateral flaps are folded along respective first 32 and second 34 fold lines, and then the top flap 30 is folded along the third fold line 36.

Figure 20:
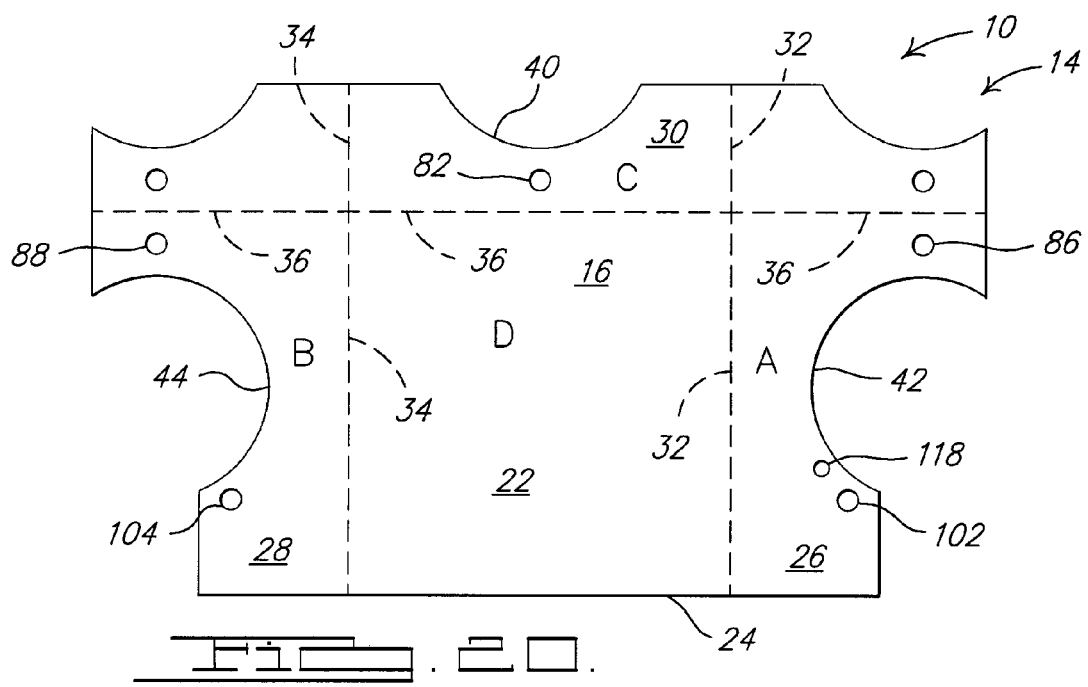
FIG. 20 illustrates a fourth embodiment of a deflector panel in an unfolded condition.
Figure 21:
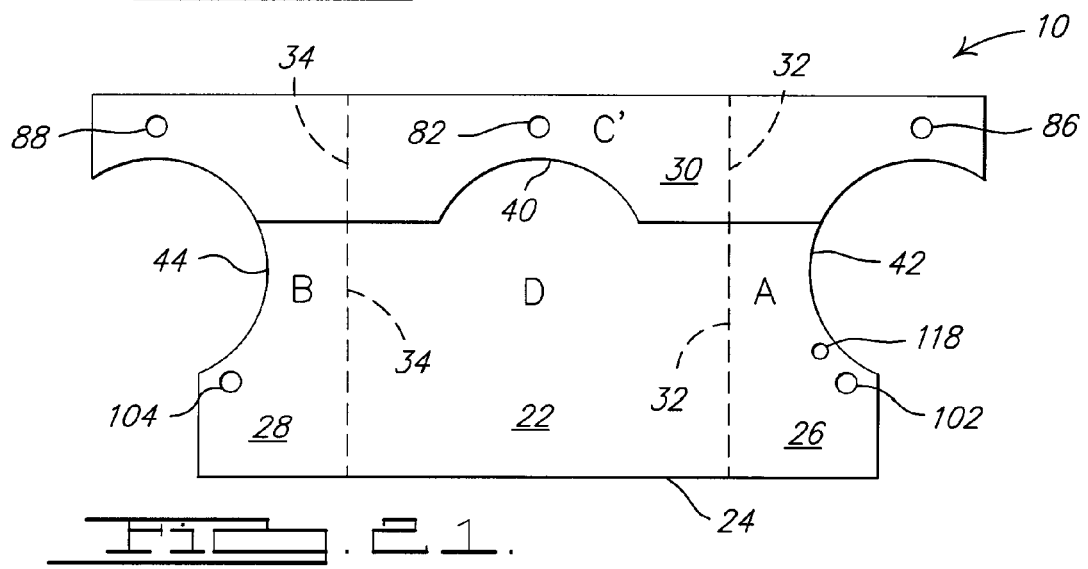
FIG. 21 illustrates a first folding operation for forming a fourth embodiment of the deflector from the deflector panel illustrated in FIG. 20.
Figure 22:
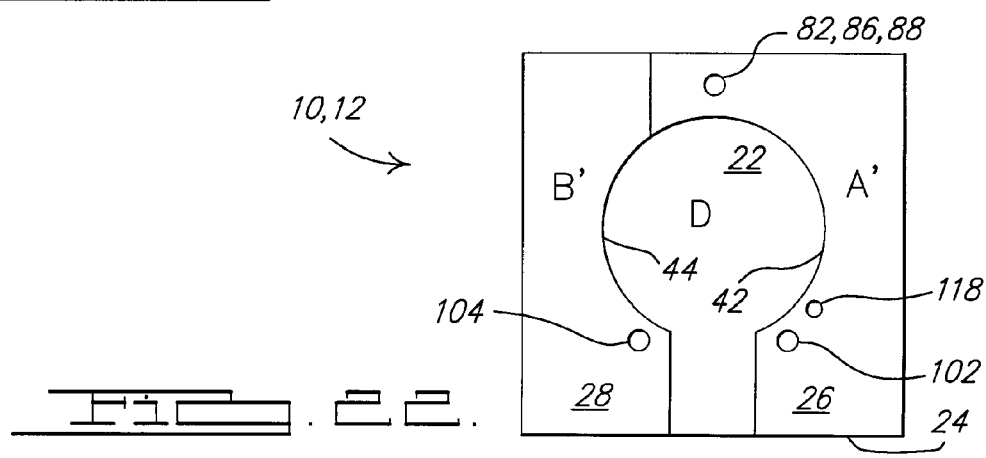
FIG. 22 illustrates final folding operations for forming the fourth embodiment of the deflector from the deflector panel illustrated in FIG. 20.

Referring to FIGS. 20-22, in accordance with a fourth embodiment of a deflector 12, the top flap 30 incorporates a first hole 82 which becomes aligned with third 86 and fourth 88 holes in the respective first 26 and second 28 lateral flaps so as to provide for receiving a first fastener 90.

Referring to FIG. 23, in accordance with a fifth embodiment of a deflector 12, the top flap 30 is joined to the first lateral flap 26 with a first sewn seam 190, e.g. by stitching, and the top flap 30 is joined to the second lateral flap 28 with a second sewn seam 192.

Referring to FIG. 24, in accordance with a sixth embodiment of a deflector 12, the top flap 30 is joined to the first lateral flap 26 and the central portion 22 with a first sewn seam 78, and the top flap 30 is joined to the second lateral flap 28 and the central portion 22 with a second sewn seam 80.

Figure 25:
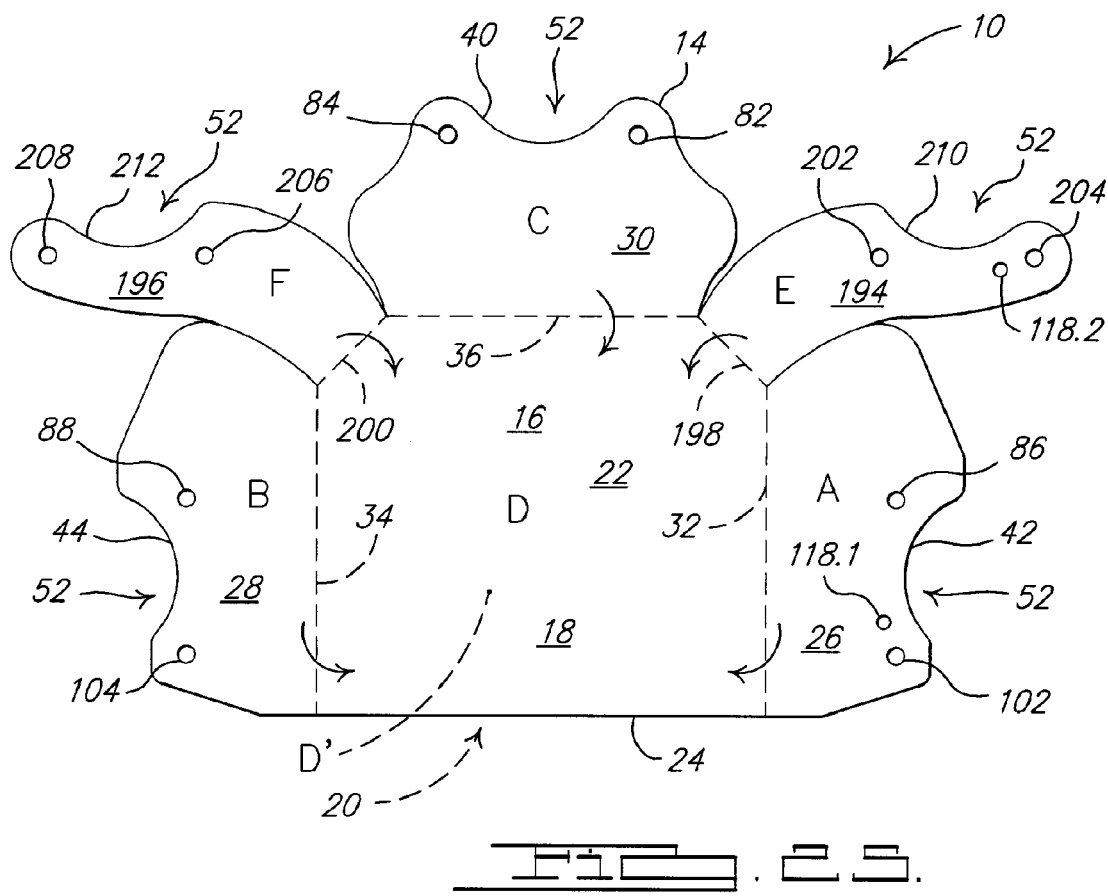
FIG. 25 illustrates a first surface of a seventh embodiment of a deflector panel.
Figure 26:
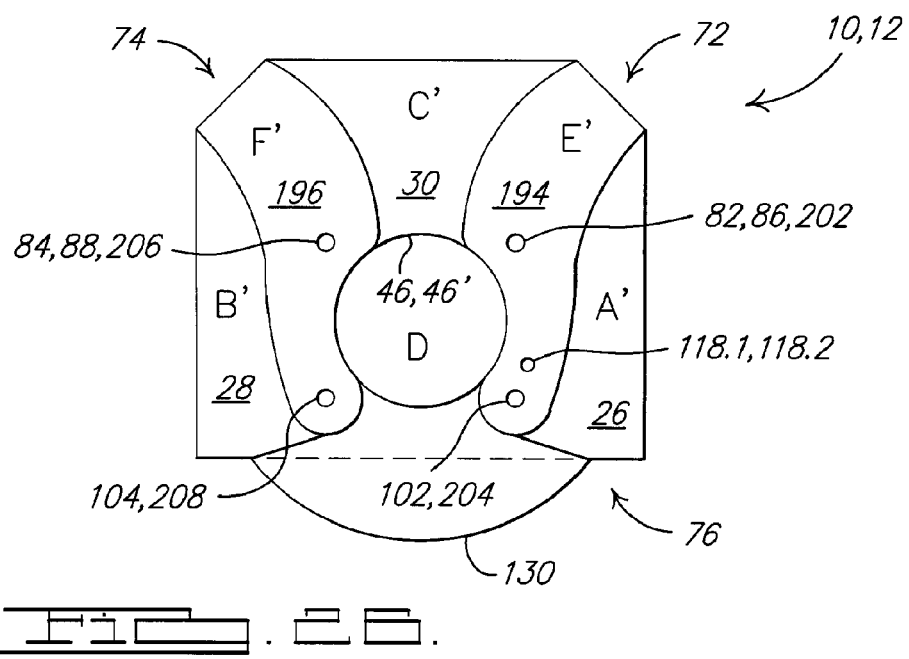
FIG. 26 illustrates a seventh embodiment of a deflector folded from the seventh embodiment of the deflector panel illustrated in FIG. 25.

Referring to FIGS. 25 and 26, a seventh embodiment of an occupant protection apparatus 10 comprises a deflector 12 comprising a panel 14 constructed of air bag material 16, for example, an air bag material 16 as described hereinabove with reference to the other embodiments. The panel 14 comprises a central portion 22 having a bottom edge 24, first 26 and second 28 lateral flaps, and a top flap 30, wherein the first 26 and second 28 lateral flaps and the top flap 30 are on opposing sides and above the central portion 22, respectively, so as to abut the sides and top thereof at respective first 32, second 34 and third 36 fold lines respectively. The top flap 30 incorporates first 82 and second 84 holes and the first 26 and second 28 lateral flaps incorporate third 86 and fourth 88 holes respectively, which collectively are adapted so that when the panel 14 is folded, the first lateral flap 26 and the top flap 30 overlap one another and the first 82 and third 86 holes become aligned so as to provide for engaging a first fastener 90 therewith, and the second lateral flap 26 and the top flap 30 overlap one another and the second 84 and fourth 88 holes become aligned so as to provide for engaging a second fastener 92 therewith, wherein the first 90 and second 92 fasteners are used to assemble the air bag inflator 50 and the deflector 12 with an air bag 94, for example, similar to that described hereinabove with reference to the other embodiments. The first 26 and second 28 lateral flaps further comprise respective fifth 102 and sixth 104 holes in respective lower portions thereof that are adapted to engage respective third 106 and fourth 108 fasteners that are also used to assemble the air bag inflator 50 and the deflector 12 with the air bag 94.

In accordance with the seventh embodiment, the panel 14 further comprises first 194 and second 196 corner flaps, wherein the first corner flap 194 is located between the top flap 30 and the first lateral flap 26, and the second corner flap 196 is located between the top flap 30 and the second lateral flap 28. The first corner flap 194 abuts the central portion 22 at a fourth fold line 198 located between the first 32 and third 36 fold lines, in a first corner region 72 of the deflector 12. The second corner flap 196 abuts the central portion 22 at a fifth fold line 200 located between the second 34 and third 36 fold lines, in a second corner region 74 of the deflector 12. The first corner flap 194 incorporates seventh 202 and eighth 204 holes which are adapted so that when the panel 14 is folded and the first corner flap 194 overlaps the top flap 30 and the first lateral flap 26, the seventh hole 202 becomes aligned with the first 82 and third 86 holes in the top flap 30 and the first lateral flap 26, respectively, and the eighth hole 204 becomes aligned with the fifth hole 102 in the first lateral flap 26. Similarly, the second corner flap 196 incorporates ninth 206 and tenth 208 holes which are adapted so that when the panel 14 is folded and the second corner flap 196 overlaps the top flap 30 and the second lateral flap 28, the ninth hole 206 becomes aligned with the second 84 and fourth 88 holes in the top flap 30 and the second lateral flap 28, respectively, and the tenth hole 208 becomes aligned with the sixth hole 104 in the second lateral flap 28.

The deflector 12 is formed from the panel 14 by folding each of the first 26 and second 28 lateral flaps inward about the respective first 32 and second 34 fold lines, folding the top flap 30 downwards about the third fold line 36, towards each other and towards the central portion 22, and folding the first 194 and second 196 corner flaps inward about the respective fourth 198 and fifth 200 fold lines so as to form a resulting folded panel 38 of the deflector 12. A top edge 40 of the top flap 30, respective outboard edges 42, 44 of the first 26 and second 28 lateral flaps, and respective edge portions 210, 212 of the first 194 and second 196 corner flaps, respectively, are shaped so as to cooperate with one another in the deflector 12 so as to form an associated first opening 46 that is adapted to receive an outlet end 48 of an air bag inflator 50, for example, as is illustrated in FIG. 11. For example, the top edge 40 of the top flap 30, the respective outboard edges 42, 44 of the first 26 and second 28 lateral flaps, and the respective edge portions 210, 212 of the first 194 and second 196 corner flaps are arcuately shaped 52 so a to provide for a substantially circular first opening 46' in the deflector 12.

In FIGS. 25 and 26, the first surfaces 18 of the first 26 and second 28 lateral flaps, the top flap 30, the central portion 22, and the first 194 and second 196 corner flaps are labeled A, B, C, D, E and F respectively, and the corresponding opposing second surfaces 20 thereof are labeled A', B', C', D', E' and F' respectively. The folded panel 38 defines a cavity 76 that is bounded by the central portion 22, the folded top flap 30, the folded first 26 and second 28 lateral flaps, and the folded first 194 and second 196 corner flaps. The cavity 76 is open proximate to the bottom edge 24 of the central portion 22 so as to provide for a flow of inflation gas therefrom, wherein the first surface 18 of the air bag material 16 of the panel 14 faces towards the cavity 76. The first 194 and second 196 corner flaps folded about the fourth 198 and fifth 200 fold lines, respectively, and secured at the seventh 202 and eighth 204 holes and the ninth 206 and tenth 208 holes, respectively, provide for inherently closing the first 72 and second 74 corner regions of the deflector 12, without requiring additional stitching.

The first lateral flap 26 and the first corner flap 194, each incorporate respective alignment holes 118.1, 118.2 that are adapted to receive an alignment tab 116 of an associated retaining structure 98 used to assemble the deflector 12 with an associated air bag 94 and an associated air bag inflator 50, so as to prevent a misalignment of the retaining structure 98 relative to the deflector 12, and so as to thereby prevent a misalignment of the air bag inflator 50 relative to both the retaining structure 98 and the deflector 12. The deflector 12 further comprises one or more heat shields 130 against the inside surfaces of the top flap 30 and the first 26 and second 28 lateral flaps, which become sandwiched between the retaining structure 98 and the combination of the top flap 30, the first 26 and second 28 lateral flaps and the first 194 and second 196 corner flaps. For example, the one or more heat shields 130 are constructed similar to that described hereinabove with reference to the other embodiments.

Referring to FIGS. 27-29, an eighth embodiment of an occupant protection apparatus 10 comprises a deflector 12 comprising a panel 14 constructed of air bag material 16, for example, an air bag material 16 as described hereinabove with reference to the other embodiments. The panel 14 comprises a central portion 22 having a bottom edge 24 and first 26 and second 28 lateral flaps, wherein the first 26 and second 28 lateral flaps abut opposing sides of the central portion 22 at respective first 32 and second 34 fold lines, respectively. The first 26 and second 28 lateral flaps incorporate a plurality of holes 86, 102 and 88, 104 respectively, that provide for engaging associated fasteners used to assemble the deflector 12 with an air bag 94 and an air bag inflator 50, for example, similar to that described hereinabove with reference to the other embodiments.

The deflector 12 is formed from the panel 14 by folding each of the first 26 and second 28 lateral flaps inward about the respective first 32 and second 34 fold lines, so that the upper and lower portions of the associated lateral edge portions 213, 214 of the first 26 and second 28 lateral flaps, respectively, overlap one another, so as to form a resulting folded panel 38 of the deflector 12. Respective outboard edges 42, 44 of the first 26 and second 28 lateral flaps are shaped so as to cooperate with one another in the deflector 12 so as to form an associated first opening 46 that is adapted to receive an outlet end 48 of an air bag inflator 50, for example, as is illustrated in FIG. 11. For example, the respective outboard edges 42, 44 of the first 26 and second 28 lateral flaps are arcuately shaped 52 so a to provide for a substantially circular first opening 46' in the deflector 12.

In FIGS. 27-29, the first surfaces 18 of the first 26 and second 28 lateral flaps, and the central portion 22, are labeled A, B and C respectively, and the corresponding opposing second surfaces 20 thereof are labeled A', B' and C' respectively. The folded panel 38 defines a cavity 76 that is bounded by the central portion 22 and the folded first 26 and second 28 lateral flaps, the top portion 216 of which is closed with at least one stitch 218 proximate to a top edge 220 of the central portion 22 and proximate to top edges 222, 224 the first 26 and second 28 lateral flaps, so as to join a top portion 226 of the central portion 22 to top portions 228, 230 of the first 26 and second 28 lateral flaps. The cavity 76 is open proximate to the bottom edge 24 of the central portion 22 so as to provide for a flow of inflation gas therefrom. In the embodiment illustrated in FIG. 28, the first surface 18 of the air bag material 16 of the panel 14 faces towards the cavity 76, in which case, the first surface 18 might be coated so as to provide for improved durability. Alternatively, referring to FIG. 29, the deflector 12 may be folded inside out relative to the embodiment illustrated in FIG. 28, so that the second surface 20 of the air bag material 16 of the panel 14 faces towards the cavity 76, in which case, the second surface 20 might be coated so as to provide for improved durability.

In the embodiment illustrated in FIGS. 27-29, the second lateral flap 28 incorporates an alignment hole 118.1 adapted to receive an alignment tab 116 of an associated retaining structure 98 used to assemble the deflector 12 with an associated air bag 94 and an associated air bag inflator 50, so as to prevent a misalignment of the retaining structure 98 relative to the deflector 12, and so as to thereby prevent a misalignment of the air bag inflator 50 relative to both the retaining structure 98 and the deflector 12. The deflector 12 may further comprises one or more heat shields 130, for example, embodied similar to that described hereinabove with reference to the other embodiments.

In other embodiments, one or both of the first 72 and second 74 corner regions of the deflector 12 may be shaped and adapted so that the cavity 76 is open thereacross so as to provide for flow of inflation gas therefrom, for example, as in the embodiment illustrated in FIG. 4.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of any claims which are derivable from the description and drawings herein, and any and all equivalents thereof.

What is claimed is:

1. An occupant protection apparatus, comprising a panel constructed of air bag material, wherein said panel comprises:
  a. a central portion, wherein said central portion comprises a bottom edge;
  b. first and second lateral flaps, wherein said first and second lateral flaps are on opposing lateral sides of said central portion, said first and second lateral flaps are each adapted to fold inward toward each other and toward said central portion so as to provide for forming a resulting folded panel, a first surface of said airbag material faces towards a cavity at least partially surrounded by said central portion and said first and second lateral flaps, said cavity is open along said bottom edge of said central portion, said cavity is closed along a top portion of said cavity, and said first and second lateral flaps are adapted to be secured inside an air bag between an exterior panel of said air bag and either an air bag inflator retaining structure or an air bag inflator when said air bag inflator is attached to said air bag; and
  further comprising a top flap, wherein said top flap is above said central portion, said top flap is adapted to fold inward toward said central portion so as to provide for further forming said folded panel, said cavity is closed along said top portion of said cavity by said top flap, and said top flap is adapted to be secured inside said air bag between said exterior panel of said air bag and either said air bag inflator retaining structure or said air bag inflator when said air bag inflator is attached to said air bag;
  wherein said top flap comprises at least one first hole adapted to receive a corresponding at least one fastener used to attach an air bag to said air bag inflator, and at least one of said first and second lateral flaps comprise at least one second hole adapted to receive a corresponding said at least one fastener or another at least one fastener used to attach said air bag to said air bag inflator;
  wherein said cavity is closed along said top portion of said cavity with at least one stitch proximate to a top edge of said central portion and proximate to top edges of said first and second lateral flaps, wherein said at least one stitch joins a top portion of said central portion to top portions of said first and second lateral flaps.

2. An occupant protection apparatus as recited in claim 1, wherein said air bag material comprises a fabric.

3. An occupant protection apparatus as recited in claim 2, wherein said fabric is coated with a coating material on at least said first surface of said air bag material.

4. An occupant protection apparatus as recited in claim 2, wherein said fabric is coated with a silicone coating material on at least said first surface of said air bag material.

5. An occupant protection apparatus as recited in claim 1, wherein said panel is shaped so as to provide at least one cut-out region, wherein said at least one cut-out region is bounded by said central portion, said top flap and one of said first or second lateral flaps, and said at least one cut-out region defines a corresponding at least one corner region of said folded panel.

6. An occupant protection apparatus as recited in claim 5, wherein said at least one cut-out region comprises a substantially rectangular shape.

7. An occupant protection apparatus as recited in claim 5, wherein said at least one cut-out region are located at approximately one-two and ten-eleven o'clock positions relative to said bottom edge of said central portion.

8. An occupant protection apparatus as recited in claim 1, wherein a top edge of said top flap, and respective outboard edges of said first and second lateral flaps are shaped so as to define an opening when said first and second lateral flaps, and said top flap are folded inward toward each other and toward said central portion of said panel.

9. An occupant protection apparatus as recited in claim 1, further comprising said retaining structure adapted to be located on an inside of said cavity of said folded panel so as to provide for securing said air bag inflator to said air bag and to said folded panel located within said air bag, wherein said retaining structure comprises a plate portion adapted to clamp against said first and second lateral flaps of said folded panel, said plate portion comprises an opening that is shaped so as to provide for receiving a portion of said air bag inflator therethrough.

10. An occupant protection apparatus as recited in claim 9, wherein either said retaining structure or said air bag inflator comprises a deflection ring adapted to deflect inflation gas generated by said air bag inflator, and said deflection ring extends towards in inside of said cavity from said plate portion of said retaining structure.

11. An occupant protection apparatus as recited in claim 9, wherein said retaining structure further comprises an alignment tab extending from said plate portion of said retaining structure, and said alignment tab is adapted to cooperate with said air bag inflator and said folded panel so as to align said air bag inflator relative to said folded panel.

12. An occupant protection apparatus as recited in claim 11, wherein either said first lateral flap or said second lateral flap comprises a hole adapted to cooperate with said alignment tab of said retaining structure.

13. An occupant protection apparatus as recited in claim 9, further comprising said air bag, wherein said air bag comprises an opening adapted to receive said air bag inflator, wherein said air bag inflator is adapted extend through said opening in said air bag into an interior of said air bag, and to generate inflation gas so as to provide for inflating said air bag, portions of said first and second lateral flaps of said folded panel are located between said retaining structure and said air bag, and said bottom edge of said panel is oriented so as to face substantially downward with respect to said folded panel when said air bag is installed in a vehicle.

14. An occupant protection apparatus as recited in claim 13, further comprising said air bag inflator, wherein a portion of said air bag proximate to said opening therein, and said portions of said first and second lateral flaps of said folded panel located between said retaining structure and said air bag, are clamped between said retaining structure and a flange of said air bag inflator with at least said first and second fasteners, and an outlet end of said air bag inflator is extended through said opening in said air bag and said opening in said plate portion of said retaining structure so that said outlet end of said air bag inflator is located within said cavity of said folded panel.

15. An occupant protection apparatus as recited in claim 1, further comprising at least one heat shield adapted to be located between an inside of said folded panel and either said retaining structure or said air bag inflator, wherein said at least one heat shield is constructed of air bag material, and said at least one heat shield comprises an opening that is shaped so as to provide for receiving a portion of said air bag inflator therethrough.

16. An occupant protection apparatus as recited in claim 15, wherein said at least one heat shield comprises a plurality of heat shields located adjacent to one another between said folded panel and either said retaining structure or said air bag inflator.

17. An occupant protection apparatus as recited in claim 15, wherein said air bag material of said at least one heat shield comprises a fabric coated with a coating material on at least one surface.

18. An occupant protection apparatus as recited in claim 15, wherein said air bag material of said at least one heat shield comprises a fabric coated with a silicone coating material on at least one surface.

19. An occupant protection apparatus as recited in claim 15, wherein at least one of an external perimeter of said at least one heat shield and an internal perimeter of said opening in said at least one heat shield comprises at least one witness element adapted to provide for aligning a woven fibers of said at least one heat shield with respect to said folded panel.

20. An occupant protection apparatus as recited in claim 15, wherein said at least one heat shield is sewn to at least one of said first or second lateral flaps, or a top flap above said central portion.

21. An occupant protection apparatus as recited in claim 1, wherein when folded, said top flap and at least one of said first and second lateral flaps overlap one another and provide for engaging said at least one fastener with at least one said first hole aligned with at least one said second hole.

22. An occupant protection apparatus, comprising a panel constructed of air bag material, wherein said panel comprises:
  a. a central portion, wherein said central portion comprises a bottom edge;
  b. first and second lateral flaps, wherein said first and second lateral flaps are on opposing lateral sides of said central portion, said first and second lateral flaps are each adapted to fold inward toward each other and toward said central portion so as to provide for forming a resulting folded panel, a first surface of said airbag material faces towards a cavity at least partially surrounded by said central portion and said first and second lateral flaps, said cavity is open along said bottom edge of said central portion, said cavity is closed along a top portion of said cavity, and said first and second lateral flaps are adapted to be secured inside an air bag between an exterior panel of said air bag and either an air bag inflator retaining structure or an air bag inflator when said air bag inflator is attached to said air bag; and
  further comprising a top flap, wherein said top flap is above said central portion, said top flap is adapted to fold inward toward said central portion so as to provide for further forming said folded panel, said cavity is closed along said top portion of said cavity by said top flap, and said top flap is adapted to be secured inside said air bag between said exterior panel of said air bag and either said air bag inflator retaining structure or said air bag inflator when said air bag inflator is attached to said air bag;
  herein said top flap comprises at least first and second holes adapted to receive corresponding first and second fasteners used to attach said air bag to said air bag inflator, said first lateral flap comprises at least a third hole adapted to receive said corresponding first fastener used to attach said air bag to said air bag inflator, and said second lateral flap comprises at least a fourth hole adapted to receive said corresponding second fastener used to attach said air bag to said air bag inflator, wherein when folded, said first lateral flap and said top flap overlap one another and provide for engaging said first and third holes with said first fastener, and said second lateral flap and said top flap overlay one another and provide for engaging said second and fourth holes with said second fastener;
  wherein the panel is configured so that gas introduced into the cavity will preferentially exit the opening at the bottom edge of the central portion to preferentially fill a lower portion of the air bag.

23. An occupant protection apparatus as recited in claim 22, further comprising: a fifth hole in said first lateral flap, wherein said fifth hole is adapted to receive a corresponding third fastener used to attach said air bag to said air bag inflator; and a sixth hole in said second lateral flap, wherein said sixth hole is adapted to receive a corresponding fourth fastener used to attach said air bag to said air bag inflator.

24. An occupant protection apparatus as recited in claim 23, wherein said first, second, third and fourth fasteners comprise corresponding first, second, third and fourth studs secured to a plate portion of said retaining structure.

25. An occupant protection apparatus as recited in claim 22, wherein said first and second fasteners comprise corresponding first and second studs secured to a plate portion of said retaining structure.

26. An occupant protection apparatus, comprising a panel constructed of air bag material, wherein said panel comprises:
   a. a central portion, wherein said central portion comprises a bottom edge;
   b. first and second lateral flaps, wherein said first and second lateral flaps are on opposing lateral sides of said central portion, said first and second lateral flaps are each adapted to fold inward toward each other and toward said central portion so as to provide for forming a resulting folded panel, a first surface of said airbag material faces towards a cavity at least partially surrounded by said central portion and said first and second lateral flaps, said cavity is open along said bottom edge of said central portion, said cavity is closed along a top portion of said cavity, and said first and second lateral flaps are adapted to be secured inside an air bag between an exterior panel of said air bag and either an air bag inflator retaining structure or an air bag inflator when said air bag inflator is attached to said air bag; and
   further comprising a top flap, wherein said top flap is above said central portion, said top flap is adapted to fold inward toward said central portion so as to provide for further forming said folded panel, said cavity is closed along said top portion of said cavity by said top flap, and said top flap is adapted to be secured inside said air bag between said exterior panel of said air bag and either said air bag inflator retaining structure or said air bag inflator when said air bag inflator is attached to said air bag;
   wherein said top flap and said first lateral flap cooperate with one another and with said central portion of said panel so as to define a first corner region of said folded panel, and said top flap and said second lateral flap cooperate with one another and with said central portion of said panel so as to define a second corner region of said folded panel, and said cavity is open at at least one of said first and second corner regions;
   wherein the panel is configured so that gas introduced into the cavity will preferentially exit the opening at the bottom edge of the central portion to preferentially fill a lower portion of the air bag.

27. An occupant protection apparatus as recited in claim 26, wherein said cavity is open at both of said first and second corner regions.

28. An occupant protection apparatus, comprising a panel constructed of air bag material, wherein said panel comprises:
   a. a central portion, wherein said central portion comprises a bottom edge;
   b. first and second lateral flaps, wherein said first and second lateral flaps are on opposing lateral sides of said central portion, said first and second lateral flaps are each adapted to fold inward toward each other and toward said central portion so as to provide for forming a resulting folded panel, a first surface of said airbag material faces towards a cavity at least partially surrounded by said central portion and said first and second lateral flaps, said cavity is open along said bottom edge of said central portion, said cavity is closed along a top portion of said cavity, and said first and second lateral flaps are adapted to be secured inside an air bag between an exterior panel of said air bag and either an air bag inflator retaining structure or an air bag inflator when said air bag inflator is attached to said air bag; and
   further comprising a top flap, wherein said top flap is above said central portion, said top flap is adapted to fold inward toward said central portion so as to provide for further forming said folded panel, said cavity is closed along said top portion of said cavity by said top flap, and said top flap is adapted to be secured inside said air bag between said exterior panel of said air bag and either said air bag inflator retaining structure or said air bag inflator when said air bag inflator is attached to said air bag;
   wherein said top flap and said first lateral flap cooperate with one another and with said central portion of said panel so as to define a first corner region of said folded panel, said top flap and said second lateral flap cooperate with one another and with said central portion of said panel so as to define a second corner region of said folded panel, and wherein said cavity is closed at least one of said first and second corner regions;
   further comprising at least one corner flap, wherein said at least one corner flap is located between said top flap and at least one of said first and second lateral flaps, said at least one corner flap is adapted to fold inward toward said central portion so as to provide for closing at least one of said first and second corner regions. and said at least one corner flap incorporates at least one hole adapted to receive a corresponding at least one fastener used to attach said air bag to said air bag inflator.

29. An occupant protection apparatus as recited in claim 28, wherein said top flap, said first lateral flap, and said central portion are sewn together proximate to said first corner region so that said first corner region is substantially closed.

30. An occupant protection apparatus as recited in claim 28, wherein said cavity is closed at both of said first and second corner regions.

31. An occupant protection apparatus as recited in claim 30, wherein said top flap, said first lateral flap, and said central portion are sewn together proximate to said first corner region so that said first corner region is substantially closed, and said top flap, said second lateral flap, and said central portion are sewn together proximate to said second corner region so that said second corner region is substantially closed.

32. An occupant protection apparatus. comprising a panel constructed of air bag material, wherein said panel comprises:
   a. a central portion, wherein said central portion comprises a bottom edge;
   b. first and second lateral flaps, wherein said first and second lateral flaps are on opposing lateral sides of said central portion, said first and second lateral flaps are each adapted to fold inward toward each other and toward said central portion so as to provide for forming a resulting folded panel. a first surface of said airbag material faces towards a cavity at least partially surrounded by said central portion and said first and second lateral flaps. said cavity is open along said bottom edge of said central portion, said cavity is closed along a top portion of said cavity, and said first and second lateral flaps are adapted to be secured inside an air bag between an exterior panel of said air bag and either an air bag inflator retaining structure or an air bag inflator when said air bag inflator is attached to said air bag; and
   further comprising a top flap, wherein said top flap is above said central portion, said top flap is adapted to fold inward toward said central portion so as to provide for further forming said folded panel, said cavity is closed along said top portion of said cavity by said top flap, and said top flap is adapted to be secured inside said air bag between said exterior panel of said air bag and either said air bag inflator retaining structure or said air bag inflator when said air bag inflator is attached to said air bag:

wherein said top flap and said first lateral flap cooperate with one another and with said central portion of said panel so as to define a first corner region of said folded panel, said top flap and said second lateral flap cooperate with one another and with said central portion of said panel so as to define a second corner region of said folded panel, and wherein said cavity is closed at least one of said first and second corner regions:

wherein said cavity is closed at both of said first and second corner regions; further comprising first and second corner flaps, wherein said first corner flap is located between said top flap and said first lateral flap, said second corner flap is located between said top flap and said second lateral flap, said first and second corner flaps are adapted to fold inward toward said central portion so as to provide for respectively closing said first and second corner regions, and said first and second corner flaps each incorporate at least one hole adapted to receive a corresponding fastener used to attach said air bag to said air bag inflator.

33. An occupant protection apparatus, comprising a panel constructed of an air bag material, wherein said panel comprises:
   a. a central portion, wherein said central portion comprises a bottom edge;
   b. first and second lateral flaps, wherein said first and second lateral flaps are on opposing lateral sides of said central portion, said first and second lateral flaps are each adapted to fold inward toward each other and toward said central portion so as to provide for forming a resulting folded panel, a first surface of said airbag material faces towards a cavity at least partially surrounded by said central portion and said first and second lateral flaps, said cavity is open along said bottom edge of said central portion, said cavity is closed along a top portion of said cavity, and said first and second lateral flaps are adapted to be secured inside an air bag between an exterior panel of said air bag and either an air bag inflator retaining structure or an air bag inflator when said air bag inflator is attached to said air bag; and
   further comprising a top flap, wherein said top flap is above said central portion, said top flap is adapted to fold inward toward said central portion so as to provide for further forming said folded panel, said cavity is closed along said top portion of said cavity by said top flap, and said top flap is adapted to be secured inside said air bag between said exterior panel of said air bag and either said air bag inflator retaining structure or said air bag inflator when said air bag inflator is attached to said air bag;
   wherein said top flap comprises at least one first hole adapted to receive a corresponding at least one fastener used to attach an air bag to said air bag inflator, and at least one of said first and second lateral flaps comprise at least one second hole adapted to receive a corresponding said at least one fastener or another at least one fastener used to attach said air bag to said air bag inflator;
   wherein said panel is shaped so as to provide at least one cut-out region, wherein said at least one cut-out region is bounded by said central portion, said top flap and one of said first or second lateral flaps, and said at least one cut-out region defines a corresponding at least one corner region of said folded panel;
   wherein said at least one cut-out region is bounded by a first edge of said top flap, a second edge of said central portion, and a third edge of a corresponding said first or said second lateral flap, and said at least one cut-out region is adapted so that said first, second and third edges are substantially aligned with one another in said folded panel.

34. An occupant protection apparatus, comprising a panel constructed of air bag material, wherein said panel comprises:
   a. a central portion, wherein said central portion comprises a bottom edge;
   b. first and second lateral flaps, wherein said first and second lateral flaps are on opposing lateral sides of said central portion, said first and second lateral flaps are each adapted to fold inward toward each other and toward said central portion so as to provide for forming a resulting folded panel, a first surface of said airbag material faces towards a cavity at least partially surrounded by said central portion and said first and second lateral flaps, said cavity is open along said bottom edge of said central portion, said cavity is closed along a top portion of said cavity, and said first and second lateral flaps are adapted to be secured inside an air bag between an exterior panel of said air bag and either an air bag inflator retaining structure or an air bag inflator when said air bag inflator is attached to said air bag; and
   further comprising a top flap, wherein said top flap is above said central portion, said top flap is adapted to fold inward toward said central portion so as to provide for further forming said folded panel, said cavity is closed along said top portion of said cavity by said top flap, and said top flap is adapted to be secured inside said air bag between said exterior panel of said air bag and either said air bag inflator retaining structure or said air bag inflator when said air bag inflator is attached to said air bag;
   wherein a top edge of said top flap, and respective outboard edges of said first and second lateral flaps are shaped so as to define an opening when said first and second lateral flaps, and said top flap are folded inward toward each other and toward said central portion of said panel;
   wherein said opening is adapted to receive an end of said air bag inflator;
   herein the panel is configured so that gas introduced into the cavity will preferentially exit the opening at the bottom edge of the central portion to preferentially fill a lower portion of the air bag.

35. An occupant protection apparatus as recited in claim 34, wherein said top edge of said top flap, and said respective outboard edges of said first and second lateral flaps are adapted to provide for clearance between said air bag inflator inserted through said opening and each of said top edge of said top flap and said respective outboard edges of said first and second lateral flaps.

36. An occupant protection apparatus, comprising a panel constructed of air bag material, wherein said panel comprises:
   a. a central portion, wherein said central portion comprises a bottom edge;
   b. first and second lateral flaps, wherein said first and second lateral flaps are on opposing lateral sides of said central portion, said first and second lateral flaps are each adapted to fold inward toward each other and toward said central portion so as to provide for forming a resulting folded panel, a first surface of said airbag material faces towards a cavity at least partially surrounded by said central portion and said first and second lateral flaps, said cavity is open along said bottom edge of said central portion, said cavity is closed along a top portion of said cavity, and said first and second lateral flaps are adapted to be secured inside an air bag between an exterior panel of said air bag and either an air bag inflator retaining structure or an air bag inflator when said air bag inflator is attached to said air bag; and further comprising a top flap, wherein said top flap is above said central portion, said top flap is adapted to fold inward toward said central portion so as to provide for further forming said folded panel, said cavity is closed along said top portion of said cavity by said top flap, and said top flap is adapted to be secured inside said air bag between said exterior panel of said air bag and either said air bag inflator retaining structure or said air bag inflator when said air bag inflator is attached to said air bag;

wherein a top edge of said top flap, and respective outboard edges of said first and second lateral flaps are shaped so as to define an opening when said first and second lateral flaps, and said top flap are folded inward toward each other and toward said central portion of said panel;

wherein said top edge of said top flap, and said respective outboard edges of said first and second lateral flaps are arcuately shaped so as to provide for a substantially circular said opening;

wherein the panel is configured so that gas introduced into the cavity will preferentially exit the opening at the bottom edge of the central portion to preferentially fill a lower portion of the air bag.

37. An occupant protection apparatus, comprising a panel constructed of air bag material, wherein said panel comprises:
  a. a central portion, wherein said central portion comprises a bottom edge;
  b. first and second lateral flaps, wherein said first and second lateral flaps are on opposing lateral sides of said central portion, said first and second lateral flaps are each adapted to fold inward toward each other and toward said central portion so as to provide for forming a resulting folded panel, a first surface of said airbag material faces towards a cavity at least partially surrounded by said central portion and said first and second lateral flaps, said cavity is open along said bottom edge of said central portion, said cavity is closed along a top portion of said cavity, and said first and second lateral flaps are adapted to be secured inside an air bag between an exterior panel of said air bag and either an air bag inflator retaining structure or an air bag inflator when said air bag inflator is attached to said air bag; and further comprising a top flap, wherein said top flap is above said central portion, said top flap is adapted to fold inward toward said central portion so as to provide for further forming said folded panel, said cavity is closed along said top portion of said cavity by said top flap, and said top flap is adapted to be secured inside said air bag between said exterior panel of said air bag and either said air bag inflator retaining structure or said air bag inflator when said air bag inflator is attached to said air bag;

wherein a top edge of said top flap, and respective outboard edges of said first and second lateral flaps are shaped so as to define an opening when said first and second lateral flaps, and said top flap are folded inward toward each other and toward said central portion of said panel;

wherein at least one of said top edge of said top flap, and said respective outboard edges of said first and second lateral flaps comprise at least one witness element adapted to provide for aligning said folded panel during an associated assembly operation of an associated air bag assembly or a portion thereof;

wherein the panel is configured so that gas introduced into the cavity will preferentially exit the opening at the bottom edge of the central portion to preferentially fill a lower portion of the air bag.

38. A method of providing an occupant protection apparatus, comprising:
  a. forming or constructing a panel of air bag material comprising a central portion, and at least first and second lateral flaps, wherein said first and second lateral flaps are adapted to fold inwards toward said central portion;
  b. folding said first and second lateral flaps inwards toward said central portion so as to form a folded panel comprising a duct, wherein said duct comprises first and second lateral boundaries formed by said first and second lateral flaps;
  c. closing a top portion of said duct at a top boundary thereof;
  d. placing a retaining structure inside a cavity of said duct;
  e. placing said folded panel on an inside surface of a first exterior panel portion of an air bag, wherein said folded panel is oriented so that an outlet of said duct proximate to a bottom edge of said panel comprising said duct is oriented substantially downwards relative to said air bag;
  f. placing an air bag inflator through a first opening in said air bag, through a second opening formed by edges said first and second lateral flaps, and through a third opening in said retaining structure; and
  g. clamping a portion of said air bag proximate to said first opening, and portions of said first and second lateral flaps proximate to said second opening, between a flange of said air bag inflator and a plate portion of said retaining structure, wherein an outlet of said air bag inflator is located within said cavity of said duct formed by said folded panel;

wherein said panel of air bag material further comprises a top flap adapted to fold inwards toward said central portion, the operation of closing said top portion of said duct comprises folding said top flap inward toward said central portion so as to form said top boundary of said duct, said second opening is further formed by an edge of said top flap, and the operation of clamping said portion of said air bag comprises clamping a portion of said top flap proximate to said second opening between said flange of said air bag inflator and said plate portion of said retaining structure;

wherein the panel is configured so that gas introduced into the cavity of the duct will preferentiallY exit the outlet at a bottom edge of the central portion to preferentially fill a lower portion of the air bag.

39. A method of providing an occupant protection apparatus as recited in claim 38, further comprising adapting said top flap and at least one of said first and second lateral flaps to be co-located about at least one fastener used to attach said air bag inflator to said air bag.

40. A method of providing an occupant protection apparatus as recited in claim 38, further comprising adapting said top flap and said first and second lateral flaps to be co-located about first and second fasteners used to attach said air bag inflator to said air bag.

41. A method of providing an occupant protection apparatus as recited in claim 38, further comprising locating at least one heat shield between said retaining structure and said portions of said first and second lateral flaps proximate to said second opening.

42. A method of providing an occupant protection apparatus as recited in claim 38, wherein said retaining structure is adapted to deflect inflation gas generated by the air bag inflator away from said retaining structure.

43. A method of providing an occupant protection apparatus as recited in claim 38, further comprising providing for at least one tether in said air bag operative between a region proximate to said first opening in said air bag and a second exterior panel portion of said air bag.

44. A method of providing an occupant protection apparatus as recited in claim 38, further comprising assembling said air bag in an air bag inflator module, wherein said air bag inflator module comprises an air bag module cover.

45. A method of providing an occupant protection apparatus as recited in claim 44, wherein said air bag inflator module is adapted to be installed in a steering wheel of a vehicle, further comprising assembling said air bag inflator module in said steering wheel of said vehicle.

* * * * *